US011922892B2

(12) United States Patent
Liu et al.

(10) Patent No.: US 11,922,892 B2
(45) Date of Patent: Mar. 5, 2024

(54) HIGH-EFFICIENCY BACKLIGHT DRIVER

(71) Applicant: META PLATFORMS TECHNOLOGIES, LLC, Menlo Park, CA (US)

(72) Inventors: Yuming Liu, Mountain View, CA (US); Chao Hu, San Ramon, CA (US); Joaquin Andres Fierro, Los Gatos, CA (US); Nathan Slattengren, San Francisco, CA (US); David Viviescas, Mountain View, CA (US); Stella Chung, Fremont, CA (US); Tajbid Rahman, Ozone Park, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/374,929

(22) Filed: Jul. 13, 2021

(65) Prior Publication Data
US 2022/0230597 A1    Jul. 21, 2022

Related U.S. Application Data

(60) Provisional application No. 63/139,533, filed on Jan. 20, 2021.

(51) Int. Cl.
G09G 3/34 (2006.01)
G02B 27/01 (2006.01)

(52) U.S. Cl.
CPC ....... G09G 3/3426 (2013.01); G02B 27/0172 (2013.01); G09G 2320/064 (2013.01)

(58) Field of Classification Search
CPC ...... H05B 45/34; H05B 45/345; H05B 45/48; H05B 45/54; H05B 47/11; H05B 45/00; H05B 45/375; H05B 45/38; H05B 45/44
See application file for complete search history.

(56) References Cited

U.S. PATENT DOCUMENTS 7,796,143 B2   9/2010   Huang
8,110,997 B2   2/2012   Muramatsu
(Continued)

OTHER PUBLICATIONS

Werner K., "Bringing Local Dimming to Small Displays (/article/display-daily/bringing-local-dimming-to-small-displays)," Display Daily, Jun. 21, 2018, 5 pages, Retrieved from the Internet: URL: https://www.displaydaily.com/article/display-daily/bringing-local-dimming-to-small-displays.

(Continued)

Primary Examiner — Wei (Victor) Y Chan
(74) Attorney, Agent, or Firm — Greenberg Traurig, LLP

(57) ABSTRACT

The disclosed devices may include a driver circuit including a voltage boost circuit, a pulse modulation controller, and optionally a headroom processor. The voltage boost circuit may be configured to receive a device input voltage (such as a battery voltage) and generate a backlight drive voltage. The pulse modulation controller may be configured to provide a pulse modulation signal to the voltage boost circuit, and may include a digital circuit or an analog circuit. Example devices may include a backlight unit receiving the backlight voltage. The optional headroom processor may provide a headroom signal to the pulse modulation controller based on a headroom voltage determined from the backlight unit. Devices may further include a backlight unit including an arrangement of light-emissive elements, and may include display devices such as head-mounted devices. Various other methods, systems, and computer-readable media are also disclosed.

16 Claims, 21 Drawing Sheets

(56) References Cited

U.S. PATENT DOCUMENTS

| | | | |
|---|---|---|---|
| 8,169,387 B2 | 5/2012 | Mittal et al. | |
| 8,462,085 B2 | 6/2013 | Inoue et al. | |
| 9,070,326 B2 | 6/2015 | Jang | |
| 9,232,587 B2 | 1/2016 | Williams et al. | |
| 9,373,288 B2 | 6/2016 | Huang et al. | |
| 9,928,771 B2 | 3/2018 | Cok | |
| 10,012,375 B1 | 7/2018 | Salessi | |
| 10,242,623 B2 | 3/2019 | Han | |
| 10,484,577 B1 | 11/2019 | Zhang | |
| 10,891,905 B1 | 1/2021 | Liu et al. | |
| 11,145,242 B2 | 10/2021 | Liu et al. | |
| 11,617,247 B2* | 3/2023 | Takahashi | H05B 45/305 315/291 |
| 2005/0024320 A1 | 2/2005 | Nowatzyk | |
| 2006/0012585 A1* | 1/2006 | Schoofs | G09G 3/3696 345/204 |
| 2006/0092146 A1 | 5/2006 | Johnson et al. | |
| 2007/0109252 A1 | 5/2007 | Shin et al. | |
| 2007/0236447 A1 | 10/2007 | Lee et al. | |
| 2007/0262732 A1 | 11/2007 | Shen | |
| 2007/0262948 A1 | 11/2007 | Han et al. | |
| 2008/0284397 A1 | 11/2008 | Chang | |
| 2009/0020685 A1 | 1/2009 | Lin | |
| 2009/0322800 A1 | 12/2009 | Atkins | |
| 2010/0156315 A1* | 6/2010 | Zhao | H05B 45/3725 315/294 |
| 2010/0296324 A1 | 11/2010 | Boeke | |
| 2013/0009557 A1* | 1/2013 | Szczeszynski | H05B 31/50 315/186 |
| 2013/0082615 A1 | 4/2013 | Williams et al. | |
| 2013/0208030 A1 | 8/2013 | Sarrasin | |
| 2013/0271514 A1 | 10/2013 | Ha | |
| 2014/0192100 A1 | 7/2014 | Tada | |
| 2014/0247295 A1 | 9/2014 | Hussain et al. | |
| 2014/0253612 A1 | 9/2014 | Hwang et al. | |
| 2014/0307011 A1* | 10/2014 | Ninan | G09G 3/342 345/691 |
| 2014/0362071 A1 | 12/2014 | Jung et al. | |
| 2015/0208469 A1 | 7/2015 | Coetzee et al. | |
| 2016/0055799 A1 | 2/2016 | Eom et al. | |
| 2017/0135172 A1 | 5/2017 | Patton et al. | |
| 2017/0192499 A1 | 7/2017 | Trail | |
| 2017/0219826 A1 | 8/2017 | Haseltine et al. | |
| 2017/0287390 A1 | 10/2017 | Lee et al. | |
| 2017/0309233 A1 | 10/2017 | Patel et al. | |
| 2018/0089861 A1 | 3/2018 | Klement et al. | |
| 2018/0158398 A1 | 6/2018 | Xiang et al. | |
| 2018/0160516 A1* | 6/2018 | Kwak | H05B 45/48 |
| 2018/0182307 A1* | 6/2018 | Tseng | G06F 3/011 |
| 2018/0267361 A1 | 9/2018 | Richards et al. | |
| 2018/0286320 A1 | 10/2018 | Tardif et al. | |
| 2018/0373094 A1 | 12/2018 | Ryoo et al. | |
| 2019/0004370 A1 | 1/2019 | Gamperl | |
| 2019/0174589 A1 | 6/2019 | Takacs | |
| 2019/0272788 A1 | 9/2019 | Chen et al. | |
| 2020/0051484 A1 | 2/2020 | Yashiki | |
| 2020/0074724 A1 | 3/2020 | Mathur et al. | |
| 2020/0111258 A1 | 4/2020 | Sears et al. | |
| 2020/0193943 A1 | 6/2020 | Iversen et al. | |
| 2020/0366206 A1 | 11/2020 | Hariharan | |
| 2021/0125542 A1 | 4/2021 | Liu et al. | |

OTHER PUBLICATIONS

International Search Report and Written Opinion for International Application No. PCT/US2022/013055, dated May 11, 2022, 12 pages.

Surkanti P.R., et al., "Multi-Channel LED Driver with Accurate Current Matching for Portable Applications," IEEE 62nd International Midwest Symposium on Circuits and Systems (MWSCAS), Aug. 4, 2019 [Retrieved on Oct. 28, 2019], pp. 941-944.

International Preliminary Report on Patentability for International Application No. PCT/US2022/013055, dated Aug. 3, 2023, 10 pages.

* cited by examiner

| | 3.3V | 3.4V | 3.5V | 3.6V | 3.7V | 3.8V | 3.9V | 4.0V | 4.1V | 4.2V | 4.3V |
|---|---|---|---|---|---|---|---|---|---|---|---|
| Output PWR | 0.414 | 0.4155 | 0.415 | 0.4148 | 0.413 | 0.414 | 0.414 | 0.414 | 0.4143 | 0.4146 | 0.415 |
| Input PWR | 0.505 | 0.505 | 0.504 | 0.502 | 0.498 | 0.496 | 0.494 | 0.492 | 0.492 | 0.492 | 0.492 |
| Efficiency | 81.98 | 82.28 | 82.34 | 82.63 | 82.93 | 83.47 | 83.81 | 84.15 | 84.21 | 84.27 | 84.35 |

HIGH-EFFICIENCY BACKLIGHT DRIVER

CROSS REFERENCE TO RELATED APPLICATION

This application claims the benefit of U.S. Provisional Application No. 63/139,533, filed 20 Jan. 2021, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
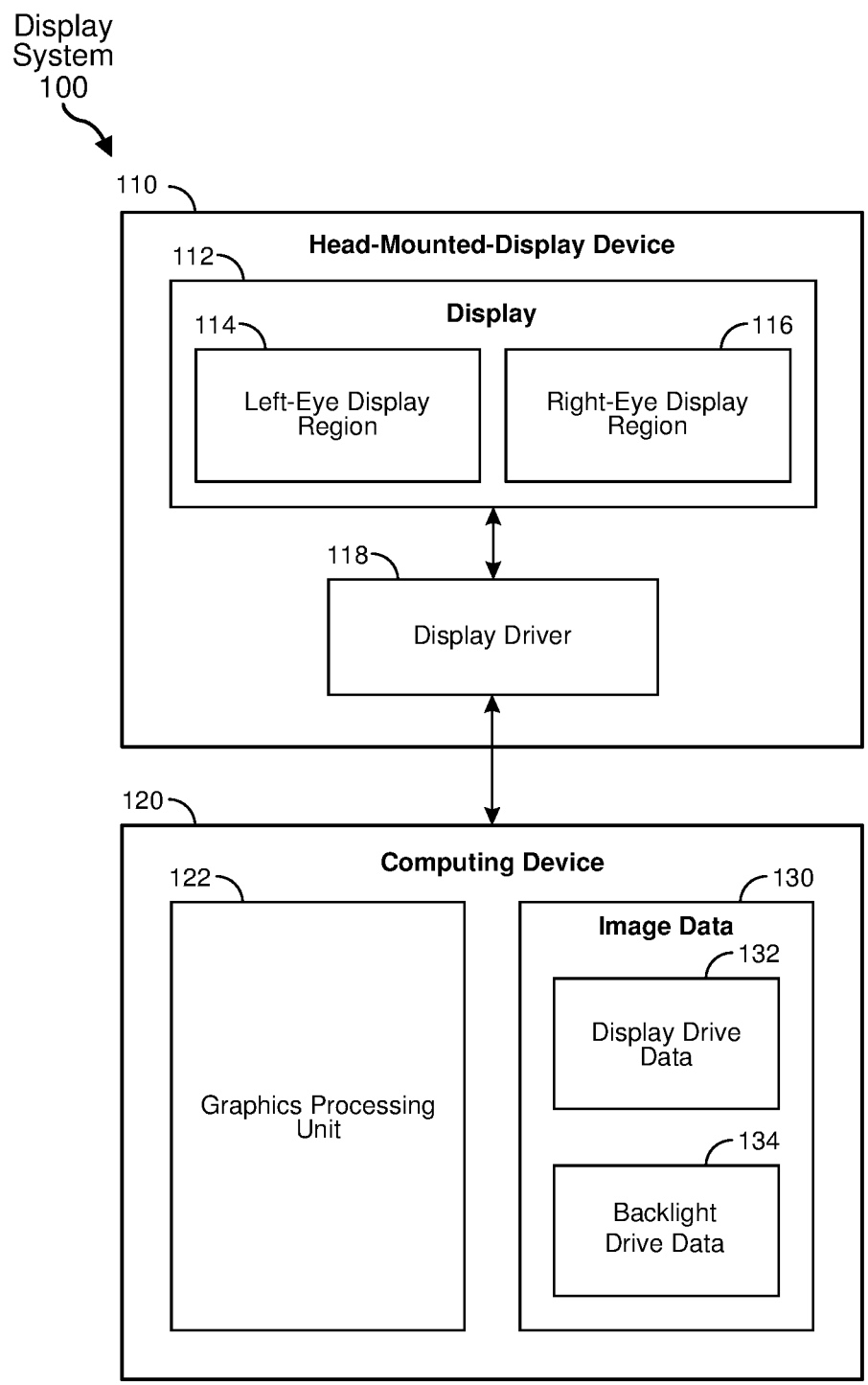
FIG. 1 illustrates an exemplary head-mounted display device in communication with a computing device.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and are described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Devices often include one or more displays, such as one or more liquid crystal displays, along with a backlight unit (BLU) and associated electronic circuits. Higher efficiency BLUs are desirable to reduce power consumption and to increase the battery life of portable devices. The present disclosure is generally directed to high-efficiency driver circuits for a BLU, devices or systems including a BLU, methods of driving a BLU, methods of fabricating a device including a BLU, and other methods and apparatus.

As is explained in greater detail below, embodiments of the present disclosure may include a driver circuit configured to provide a boost voltage as a backlight voltage for a BLU. An example driver circuit may be configured to receive a device input voltage (such as a relatively low battery voltage) and provide a boost voltage to the BLU, where the boost voltage is appreciably higher than the device input voltage. The driver circuit may allow the battery voltage to be stepped up, or boosted, to appreciably higher values.

Features from any of the embodiments described herein may be used in combination with one another in accordance with the general principles described herein. These and other embodiments, features, and advantages may be more fully understood upon reading the following detailed description in conjunction with the accompanying drawings and claims.

Figure 3:
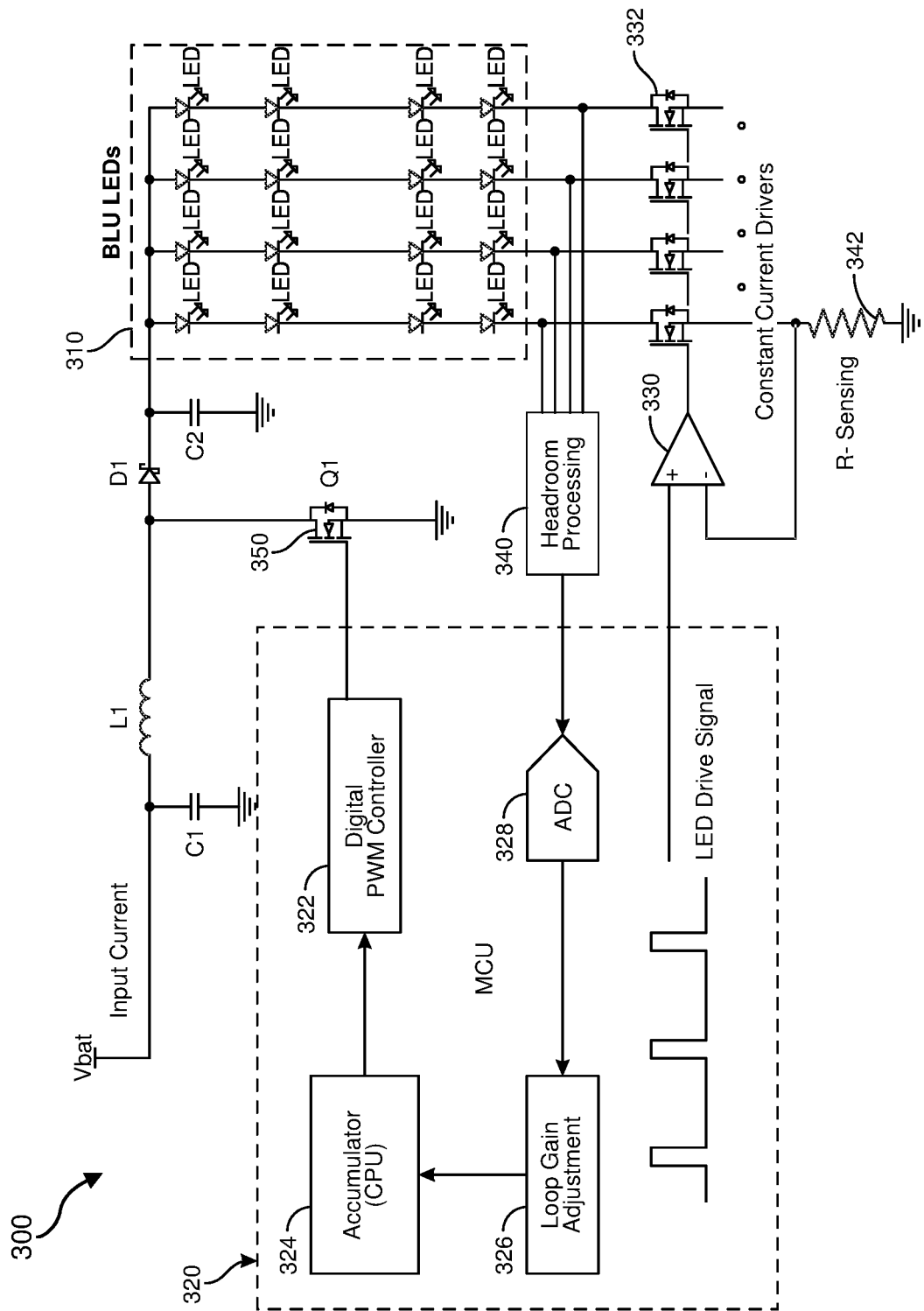
FIG. 3 shows an example driver circuit, including a digital pulse modulation controller that provides a pulse modulation signal to a voltage boost circuit.
Figure 4:
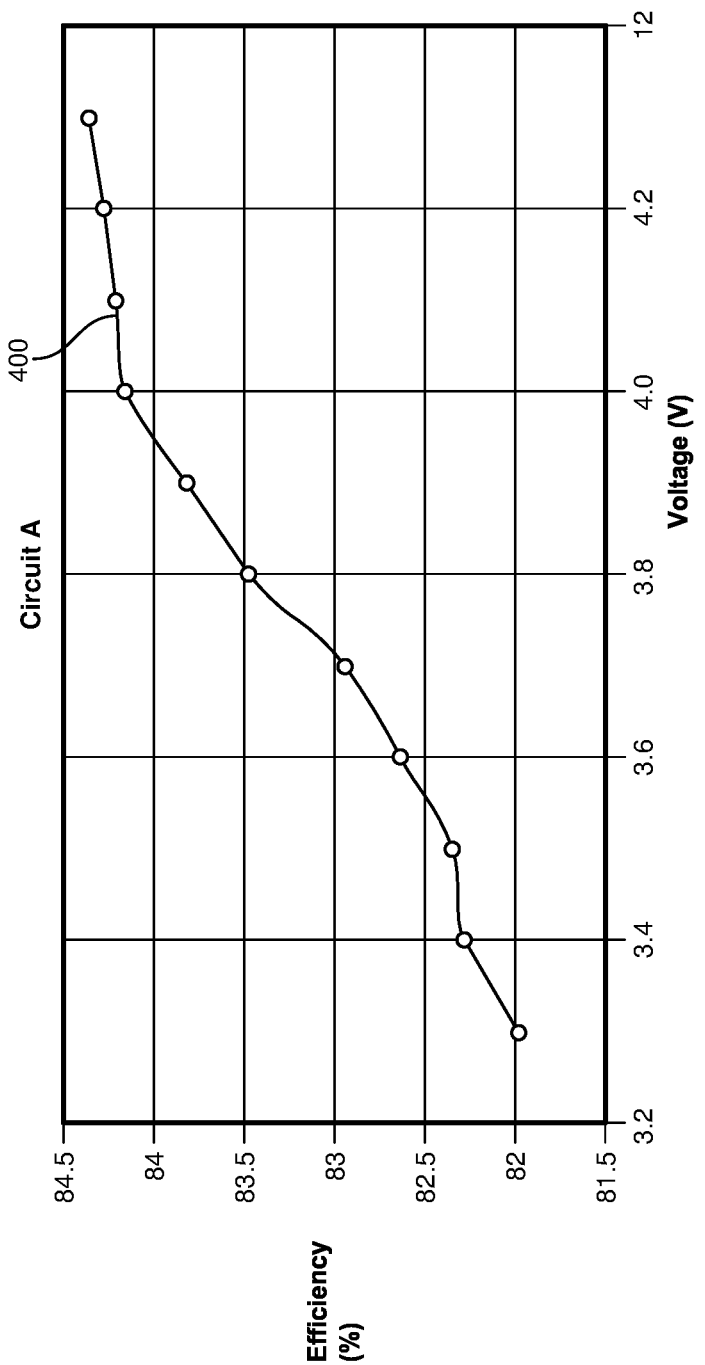
FIG. 4 shows example power efficiencies obtained as a function of device input voltage for a driver circuit similar to that shown in FIG. 3.
Figure 5:
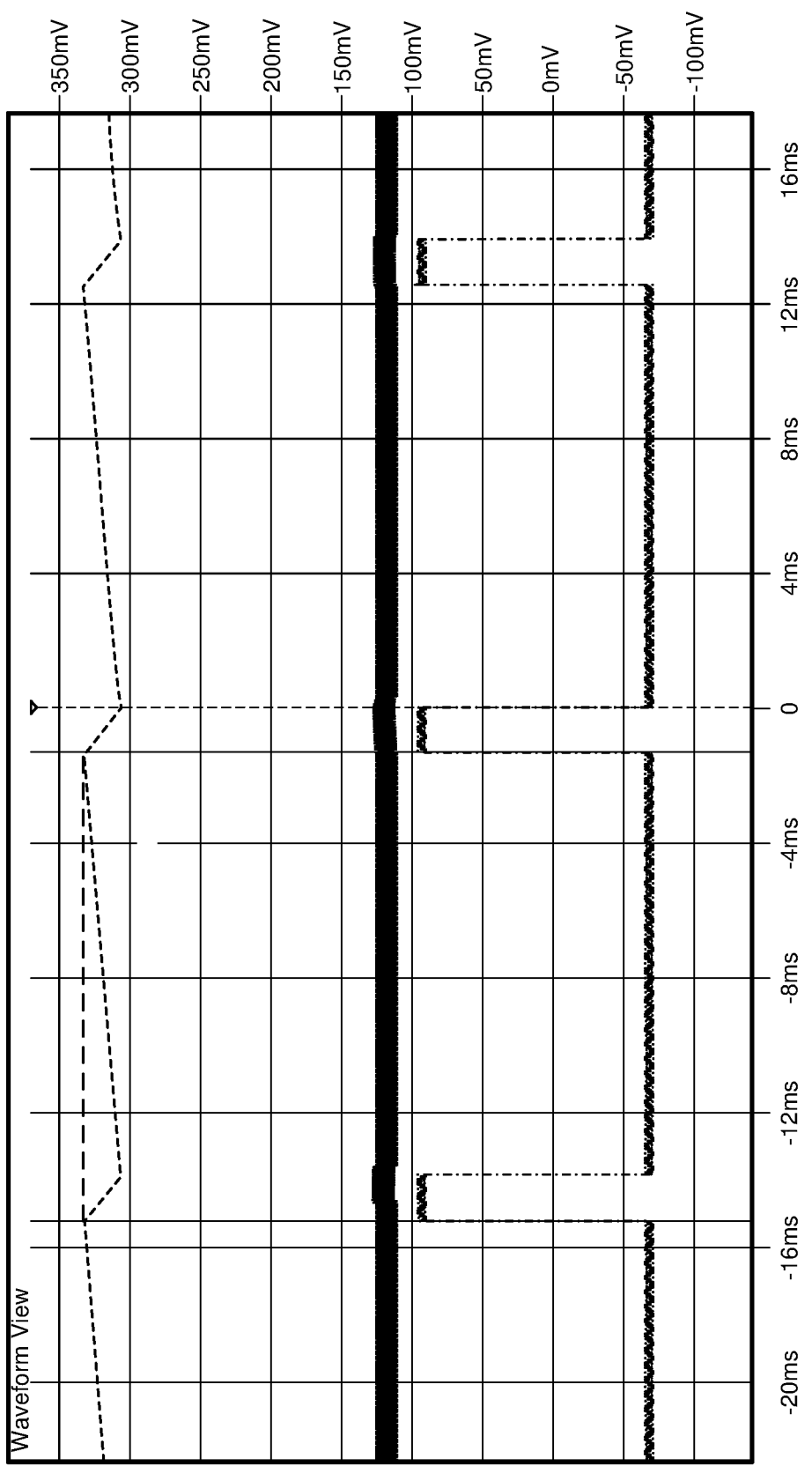
FIG. 5 shows an example input current, boost voltage, and pulse modulation signal for an example driver circuit operation.
Figure 18:
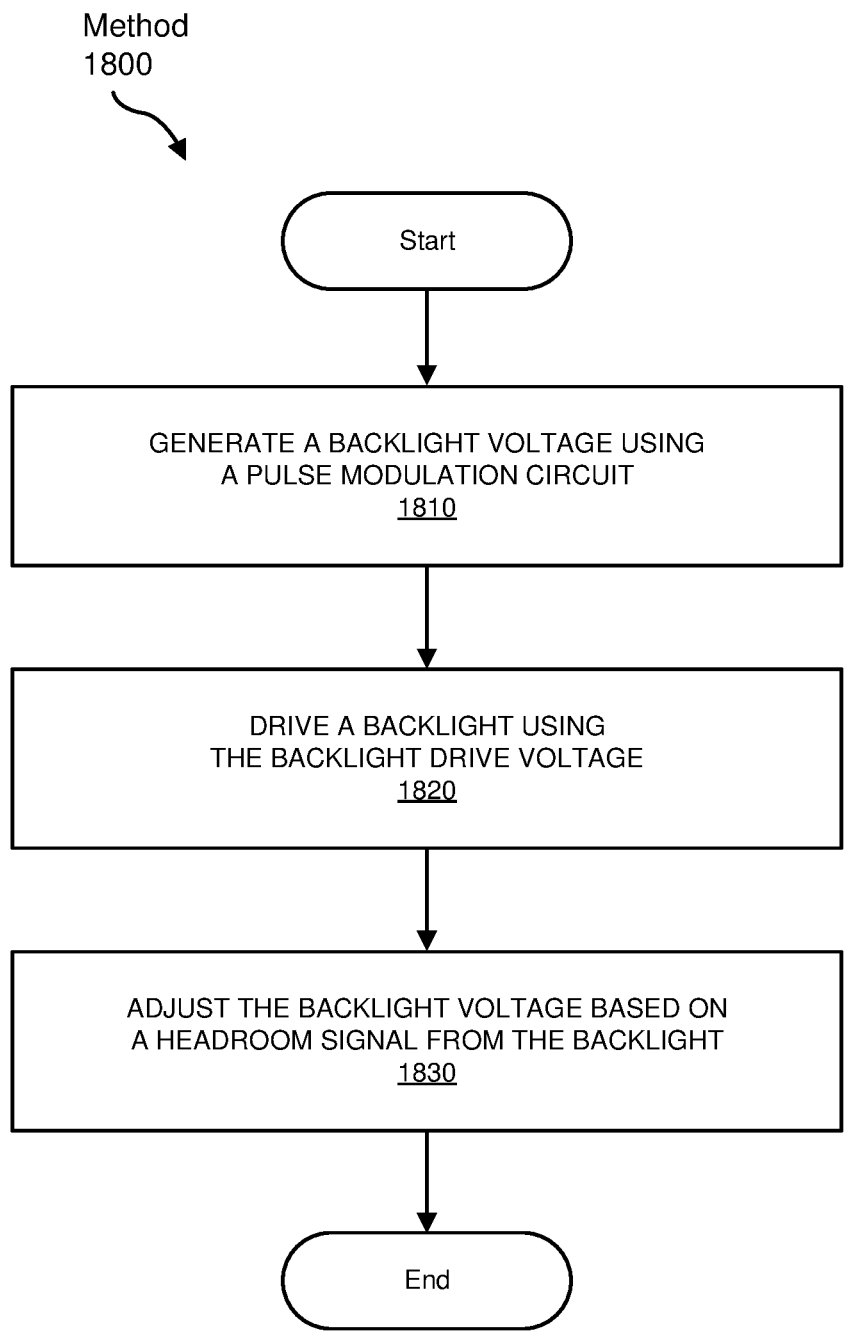
Figure 19:
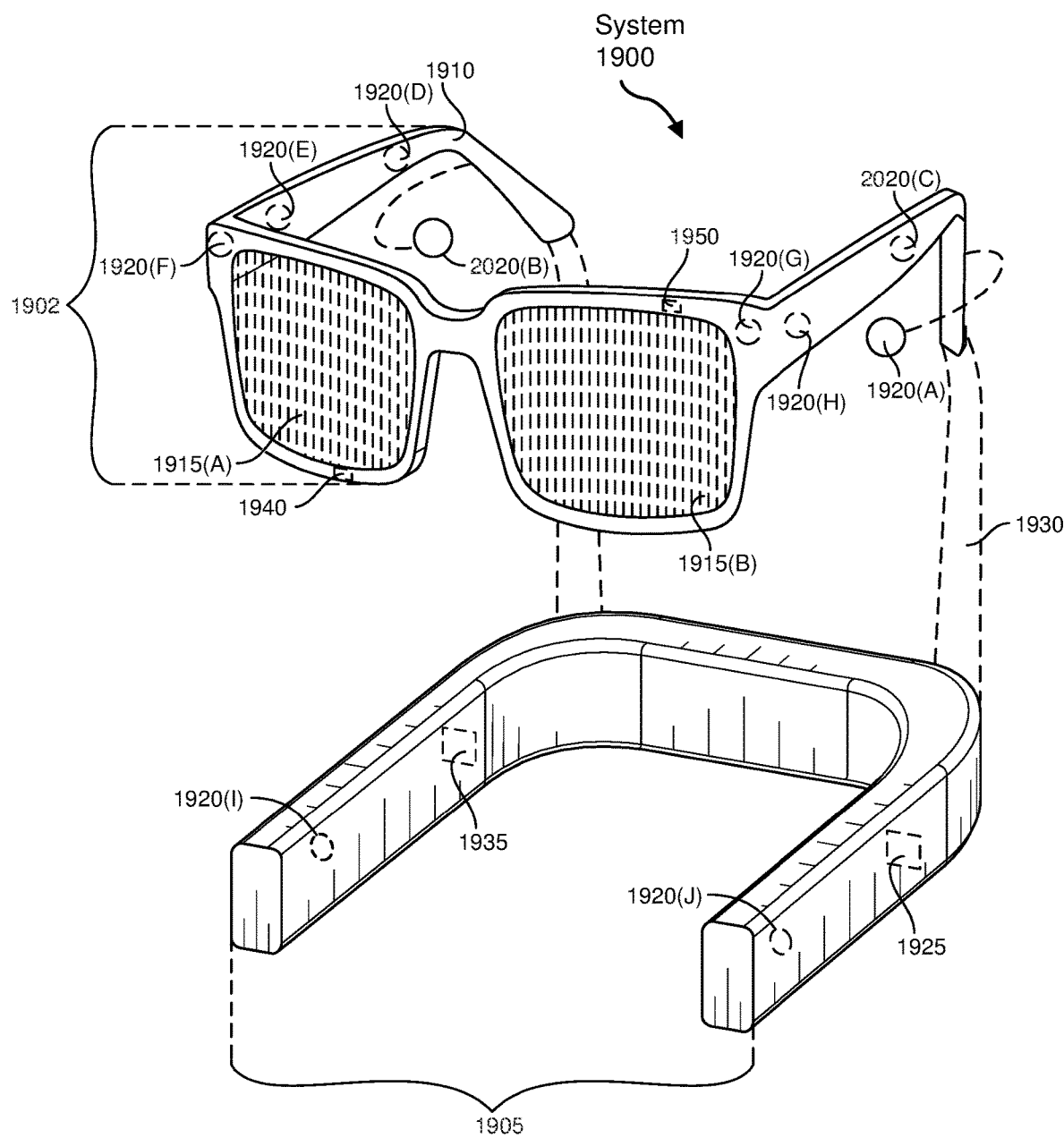
FIG. 19 is an illustration of exemplary augmented-reality glasses that may be used in connection with embodiments of this disclosure.
Figure 20:
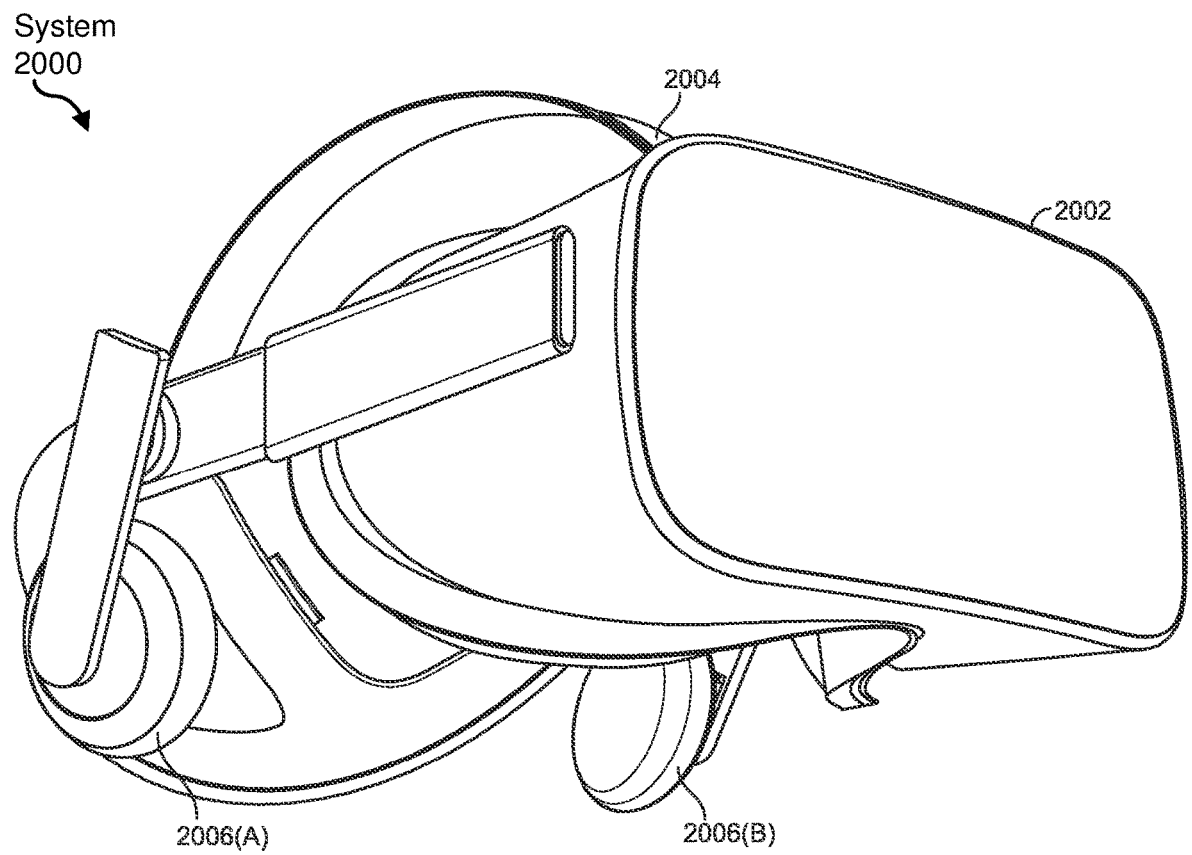
FIG. 20 is an illustration of an exemplary virtual-reality headset that may be used in connection with embodiments of this disclosure.

The following provides, with reference to FIGS. 1-20, detailed descriptions of example devices and methods related to example driver circuits and devices and systems including example driver circuits. FIG. 1 shows an example schematic of a head-mounted device, FIG. 2 shows an example BLU, FIGS. 3-5 show a schematic and characteristics of a BLU driver including a digital pulse width modulation (PWM) controller, FIGS. 6-9 show a schematic and characteristics of a BLU driver including an analog PWM controller, FIGS. 10-13 show a schematic and characteristics of a BLU driver including an analog PWM controller with headroom processing, FIGS. 14-17 show a further example driver circuit schematic and circuit characteristics, FIGS. 18-19 show example drive methods, and FIGS. 19-20 show example AR/VR (augmented reality and/or virtual reality) device applications.

Example devices incorporating the principles described herein may include backlight assemblies including a BLU and a driver circuit configured to provide a boost voltage to the BLU. A backlight assembly may be further configured to receive a BLU drive signal. Such example devices also may include head-mounted devices such as augmented reality and/or virtual reality devices. In some cases, these example devices may be battery powered. As explained in detail below, the example drive circuits described herein may provide a number of advantages for battery-powered operation, including enhanced efficiencies of the boost circuit used to provide the backlight voltage, and reduced input current ripple.

FIG. 1 illustrates an exemplary display system 100 including a head-mounted display device 110 in communication with a computing device 120. The display device 110 may include a display 112 including a left-eye display region 114 and a right-eye display region 116, and may further include a display driver 118. The display device 110 may be in communication with computing device 120 over a communications link, represented by a double-headed arrow. The computing device 120 may include a graphics processing unit 122 and image data 130. The image data may be stored in a memory device or received from an external device, for example, over an external link. Image data 130 may include display drive data 132, which may be provided to the display driver 118 over the communications link. Image data may (optionally) also include backlight drive data 134, which may allow adjustment of backlight brightness, for example, based on display drive data or other parameters (such as user preference). In some examples, the display device 110 and computing device 120 may be integrated into a unitary device, such as a head-mounted device (HMD). In some examples, a HMD may include the display device 110, and the computing device may be located at a different location and communicate with the display device over a wired or wireless communications link.

Figure 2A:
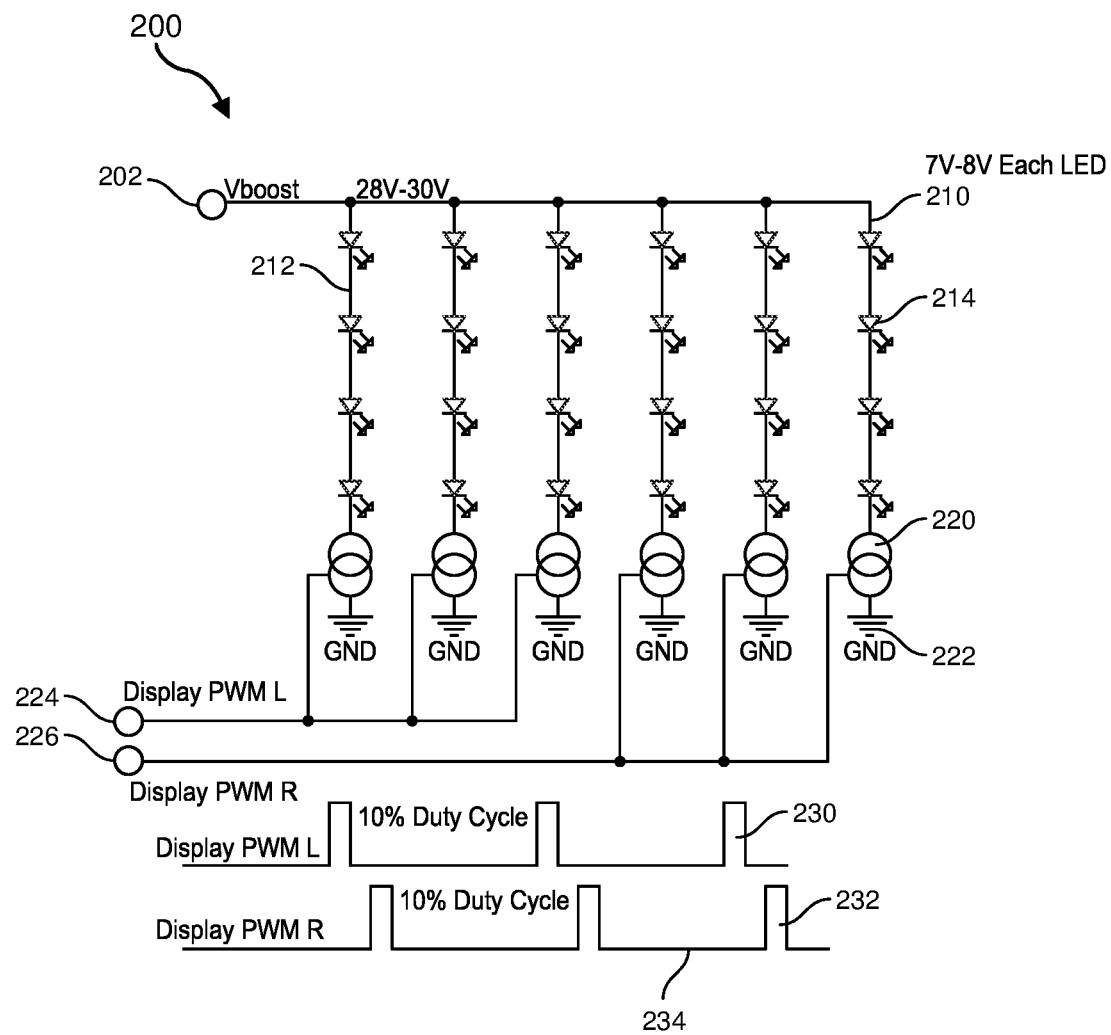
FIGS. 2A and 2B illustrate an example backlight unit (BLU) and a simplified schematic of a driver circuit for a BLU.

FIG. 2A illustrates an example BLU 200, including an input 202 configured to receive a BLU drive voltage (also referred to as a boost voltage), an arrangement of light emitting diodes (LEDs) 210 (including LEDs such as LED 214 arranged in LED strings 212), and constant current drivers 220 connecting to ground 222. LEDs may be arranged in LED strings in which the LEDs are arranged electrically in series. LED strings may be then arranged electrically in parallel. The constant current drivers may be controlled using pulse modulated drive signals, in this example a left display PWM signal received at left drive input 224 and a right display signal received at right drive input 226. The pulse modulated signals used to drive the BLU may be obtained from a control circuit that is also configured to drive an associated display panel. The peak current for each LED string may be in the range 80 mA-120 mA, though this is a representative example and not limiting. Representative PWM signals for left and right displays are shown with pulses 230 and 232 respectively. Drive signals may include pulses 232 separated by low signal level regions 234.

Figure 2B:
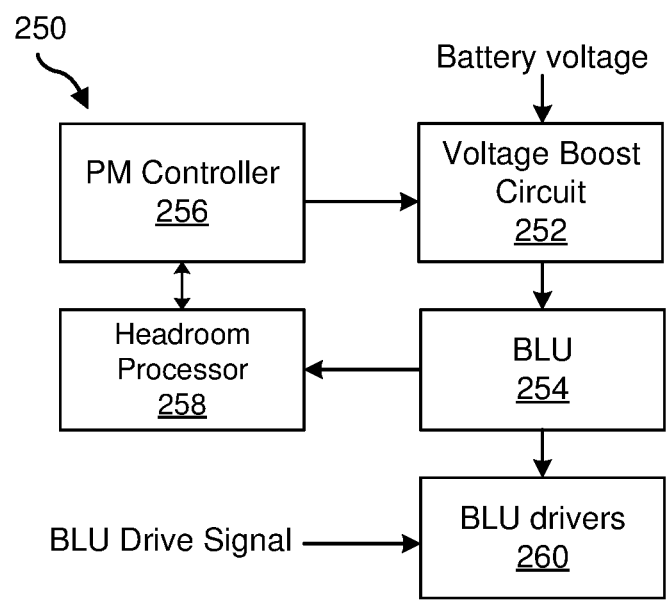

FIG. 2B shows a block diagram of a driver circuit 250 for a BLU 254, such as a BLU as shown in FIG. 2A. The driver circuit 250 includes a voltage boost circuit 252 configured to receive an input voltage (e.g., a battery voltage) and provide a stepped-up voltage (also referred to as a boost voltage). The boost voltage is used to energize the light emissive elements (such as LEDs) of the BLU 254. The driver circuit 250 may further include a pulse modulation controller 256 (configured to provide a pulse modulation (PM) signal to the voltage boost circuit 252), a headroom circuit 258 providing a headroom signal to the pulse modulation controller 256, and BLU drivers 260 (e.g., including constant current drivers for each LED string), which may be configured to receive a BLU drive signal. The BLU drive signal may energize the BLU at intervals, for example, using a pulsed drive signal having a duty ratio. Aspects of this circuit are discussed in more detail below.

FIG. 3 shows a schematic of an example driver circuit 300 that receives an input current at an input voltage. In this example, the input voltage may be a battery voltage and denoted $V_{bat}$. In this example, a voltage boost circuit may be provided by various components (e.g., the components denoted capacitor C1, inductor L1, transistor Q1, diode D1, and capacitor C2). A pulse modulation controller 320 provides a pulse modulation signal to the transistor 350 (also denoted Q1) of the voltage boost circuit. The pulse modulation controller 320 includes a digital pulse width modulation controller 322, accumulator 324, loop gain adjuster 326, and analog-to-digital converter (ADC) 328. The boost voltage, stepped up from the battery voltage by the voltage boost circuit, is used to drive the BLU 310. The BLU includes an arrangement of light-emitting diodes 312, including a plurality of LED strings 314. A headroom processor 340, described in more detail below, provides a headroom signal to the ADC 328 of pulse modulation controller 320. The headroom signal may be used to adjust the loop gain of the pulse modulation controller, for example, by reducing the duty cycle of the pulse width modulation of the headroom to less than a predetermined amount. An LED drive signal is received by amplifier circuit 330 and used to energize the LEDs using the constant current drivers 332. A signal based on the current passing through sensing resistor 342 may be used to stabilize the drive currents.

FIG. 4 shows example power efficiencies 400 obtained as a function of device input voltage for a driver circuit similar to that shown in FIG. 3. In this example, an efficiency of 82.9% is obtained for a typical lithium ion battery voltage of 3.7 V.

FIG. 5 shows an example input current, boost voltage, and pulse modulation signal as a function of time (in milliseconds) for operation of an example driver circuit, such as that shown in FIG. 3. In this example, the ordinate represents an oscilloscope screen signal level in mV, but may be considered as arbitrary units. The input voltage (shown as the top dashed line) showed some ripple due to the pulsed driving of the BLU. The middle line represents an input current of 103 mA. The drive pulses are shown as the lower dot-dash line. In this example, the battery voltage was approximately 3.7 V, the boost voltage was 26.5 V, the input current was 103 mA, the input power factor was an excellent 0.99, and the input current ripple was approximately 14.6 mA. The frame frequency was 70 Hz, and the PWM duty cycle was 10%. The drive pulse leading edge slew rate was approximately 8 A/sec.

Figure 6:
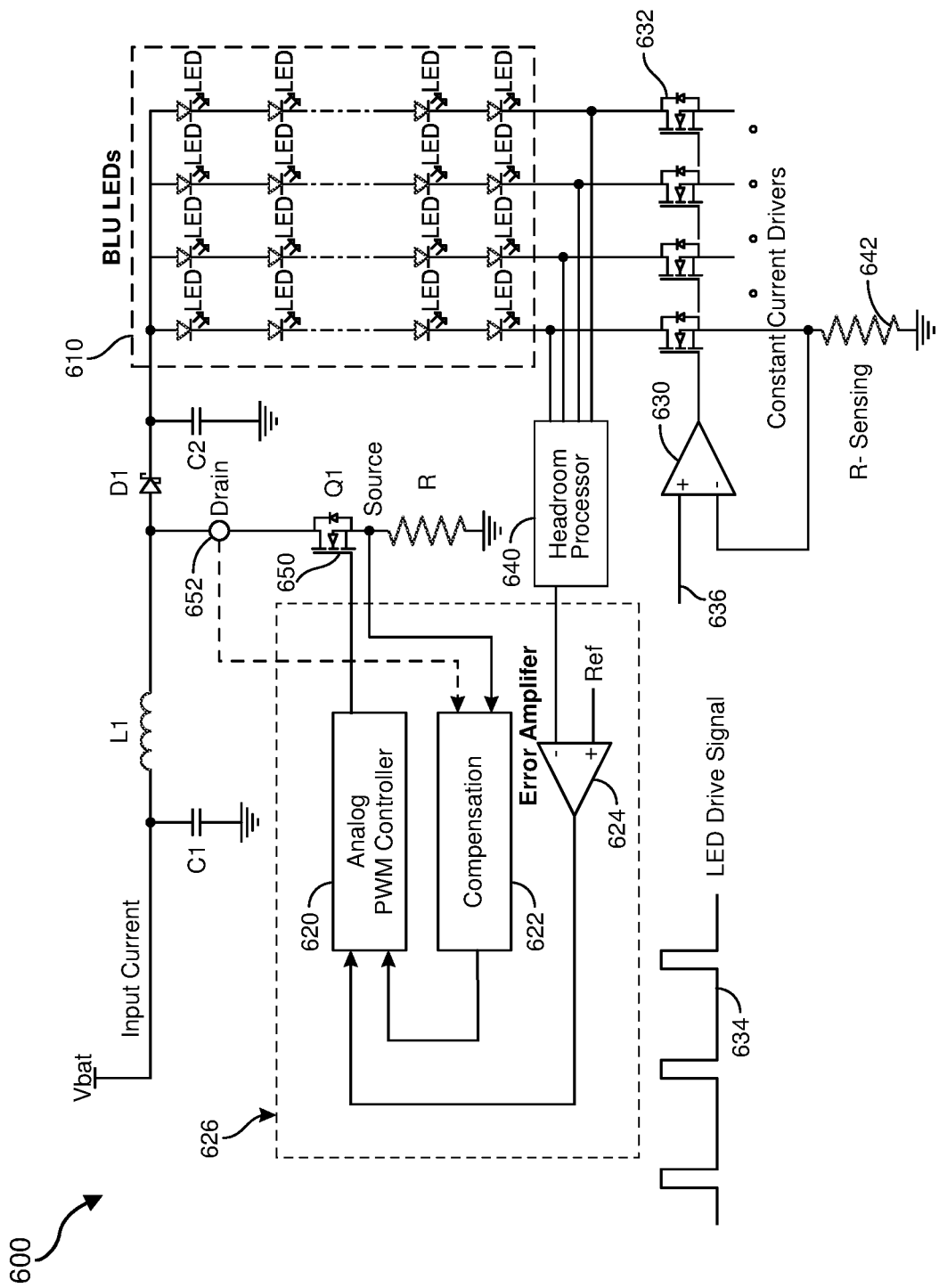
FIG. 6 shows an example driver circuit including an analog pulse width modulation controller and headroom processing.

FIG. 6 shows a further example driver circuit 600 including a pulse modulator controller 626 and a headroom processor 640. In this example, a compensation circuit 622 may receive a signal from the source of transistor 650 (also denoted Q1), which may be termed source current sensing. In other examples, alternatively, the compensation circuit 622 may receive a signal from the drain connection 652, which may be termed drain current sensing. This is discussed further below in relation to FIG. 7. Headroom processor 640 provides a headroom signal to error amplifier 624, which may be used to modify the output level of PWM controller 620. The pulse modulation controller 626 includes an analog pulse width modulation controller 620 that provides a pulse modulation signal to the transistor 650. The transistor 650 may be a MOSFET (metal-oxide-semiconductor field-effect transistor) component of a voltage boost circuit, similar to that discussed above in relation to FIG. 3.

The voltage boost circuit includes capacitance C1, inductor L1, transistor 650 (also denoted Q1) diode D1, and capacitor C2. A boost voltage is provided to BLU 610, which may be similar to that discussed above in relation to FIG. 3. The BLU may include constant current drivers 632, and a signal based on the current passing through sensor resistor 642 may be used to stabilize the drive current. Amplifier 630 receives the LED drive signal (represented as pulsed signal 634) at amplifier input 636. The amplifier helps stabilize the drive current using a signal received by the other amplifier input, based on the current flowing through the sensing resistor 1042. In this context, the term amplifier may also refer to a low-gain comparator.

Figure 7:
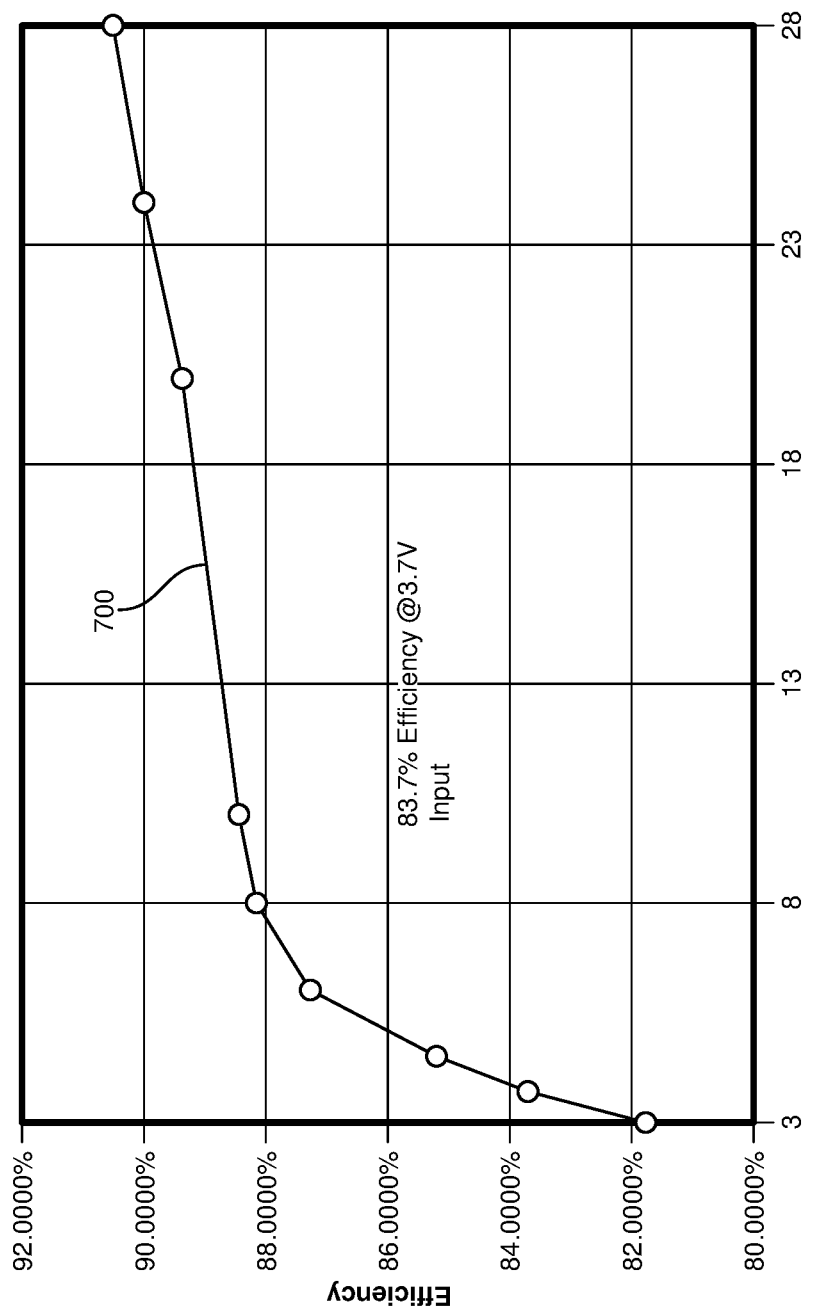
FIG. 7 shows example power efficiencies obtained as a function of device input voltage for a driver circuit similar to that shown in FIG. 6.

FIG. 7 shows example boost efficiencies 700 obtained as a function of BLU input voltage for a driver circuit similar to that shown in FIG. 6. In this example, a boost efficiency of 83.7% was obtained for a typical 3.7 lithium ion battery input, using source current sensing as discussed above in relation to FIG. 6.

Figure 8:
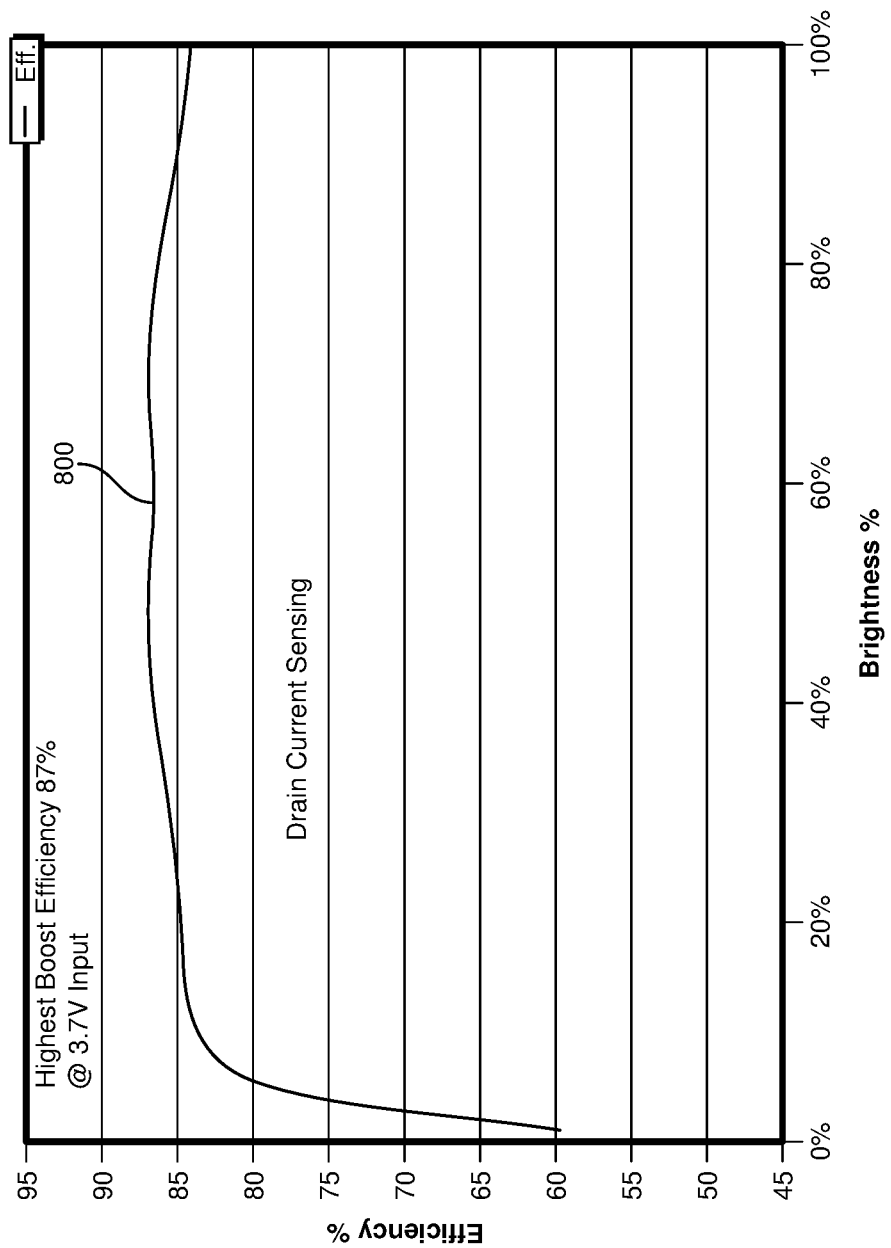
FIG. 8 shows example boost efficiencies obtained as a function of BLU brightness for a driver circuit similar to that shown in FIG. 6.

FIG. 8 shows example boost efficiencies 800 obtained as a function of BLU brightness (as a percentage of maximum brightness) for a driver circuit similar to that shown in FIG. 6. Drain current sensing was used, as discussed above in relation to FIG. 6. In this example, a boost efficiency of 87% was obtained for an input voltage of 3.7 A.

Figure 9:
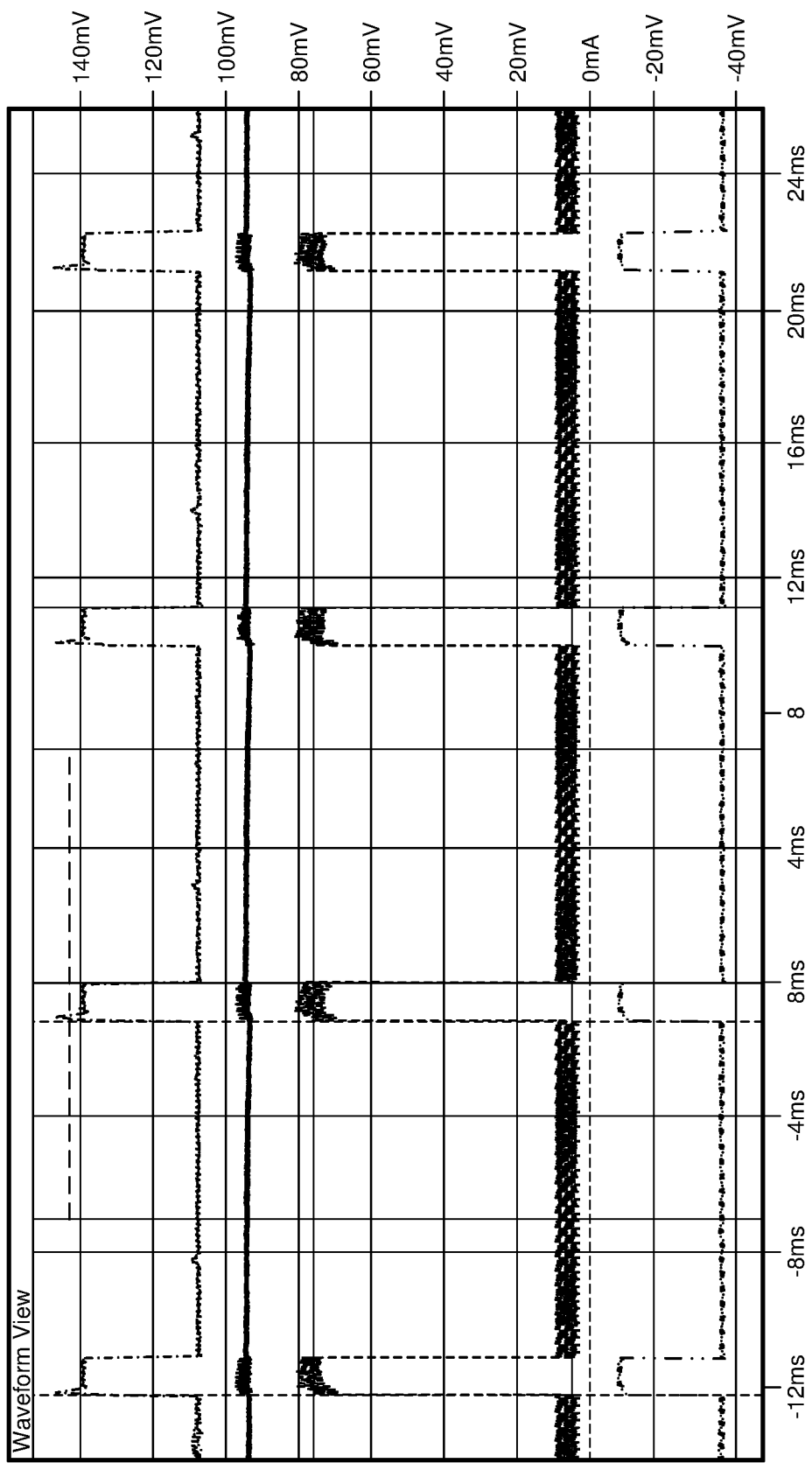
FIG. 9 shows example input currents for a driver circuit similar to that shown in FIG. 6.

FIG. 9 shows example input currents for a BLU using a circuit similar to that shown in FIG. 6. In this example, the top curve (with a dot-dash pattern) shows the BLU input current, having an average current value of 316 mA, a peak current of 3.16 A, and an input voltage of 3.69 V. The input current from the battery shows large fluctuations (which may be difficult for a conventional battery to handle). The fluctuations may be expressed as a power factor (having a value of 1 for a direct signal with no fluctuations), and in this case the power factor is 0.32. The second-from-top trace (solid line) shows the boost voltage, having an average value of 25.9 V. The third-from-top signal (dashed line) represents LED current, having an average value of 69.9 mA per string with a duty cycle of 10%. The bottom trace (with a dot-dot-dash pattern) shows the headroom signal, in this case having a value of 680 mV.

Figure 10:
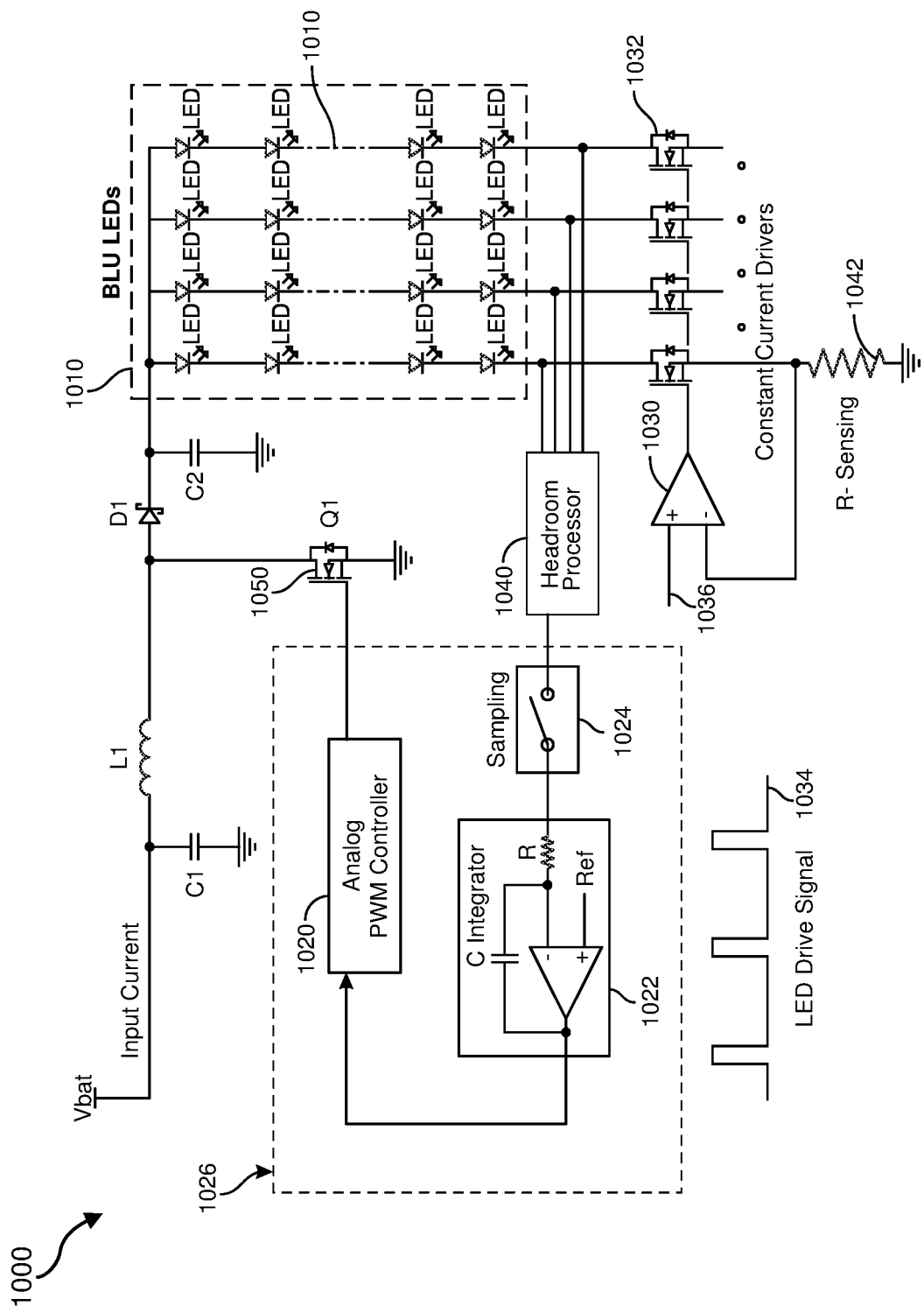
FIG. 10 shows a further example driver circuit including an analog pulse width modulation controller and headroom processing.

FIG. 10 shows a further example driver circuit 1000 including a pulse modulation controller 1026 and headroom processor 1040. The pulse modulation controller 1026 includes an analog pulse-width modulation (PWM) controller 1020, an integrator 1022, and a sampling module 1024. In this example, the sampling module may detect a headroom signal at intervals, and the headroom signal may be processed (e.g., integrated) and passed to the pulse modulation controller 1020. The driver circuit may include a voltage boost circuit including capacitor C1, inductor L1, transistor Q1 (1050), diode D1, and capacitor C2. The voltage boost circuit provides a boost voltage to BLU 1010, including LED strings 1012. The LED strings have associated LED drivers 1032, and an amplifier circuit 1030 is configured to receive the LED drive signal (represented as drive signal 1034) at amplifier input 1036. The amplifier helps stabilize the drive current using a signal based on the current flowing through the sensing resistor 1042.

Figure 11:
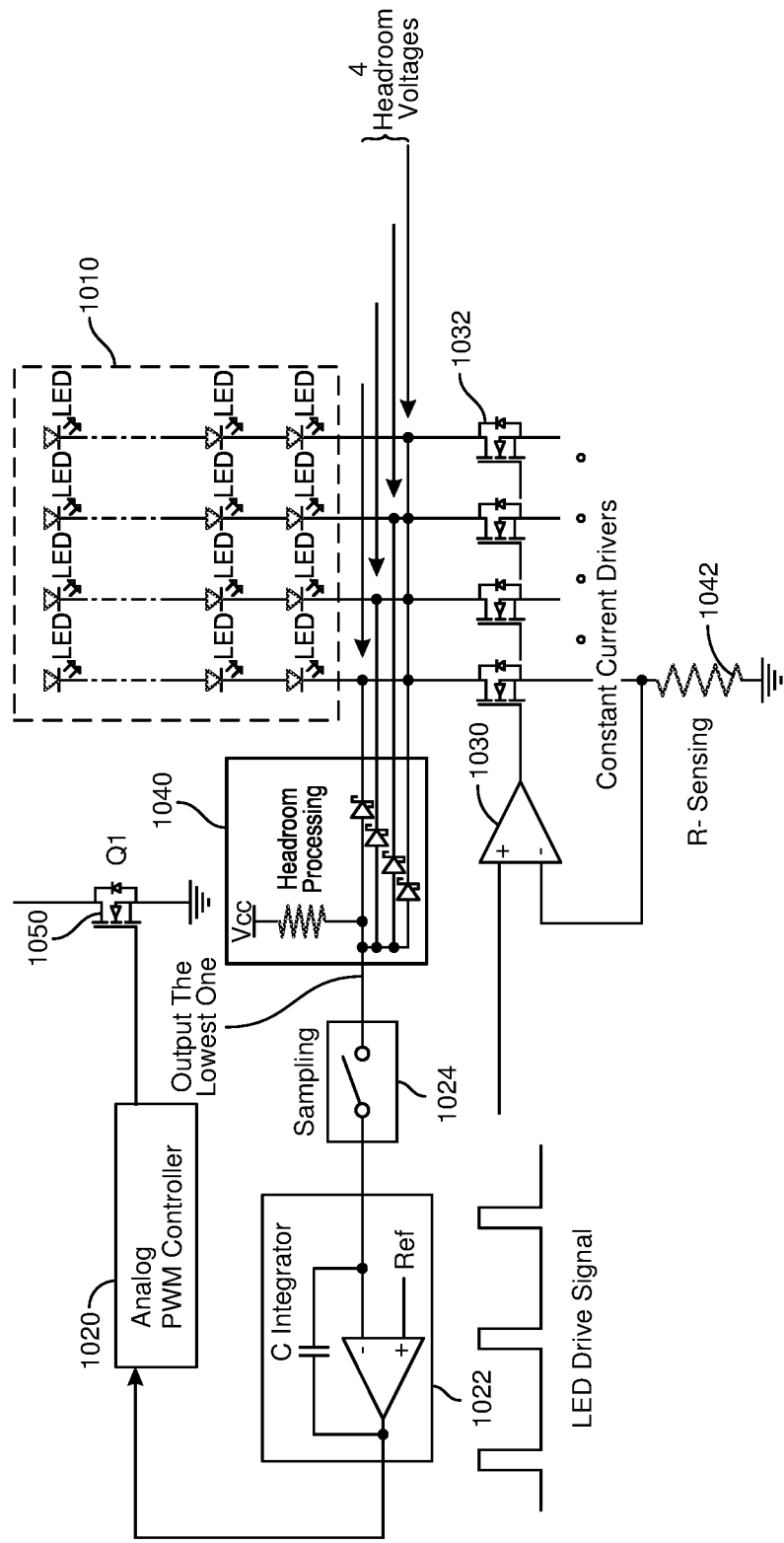
FIG. 11 shows further examples of a headroom processing circuit that may be used, for example, in a driver circuit similar to that shown in FIG. 10.

FIG. 11 shows a more detailed portion of a driver circuit similar to that discussed above in FIG. 10. Element numbers have the same meaning as discussed above in relation to FIG. 10, though there may be minor differences and omissions for clarity (e.g., the resistor is not shown in the integrator 1022). In this example, the headroom processor 1040 receives a headroom voltage from each of the LED strings and outputs the lowest value as a headroom signal to the sampling module 1024. The pulse modulation circuit may use the headroom signal to adjust the pulse modulation signal supplied to the transistor 1050 of the voltage boost circuit. Each LED string may have a different headroom voltage. A headroom processing module may include Schottky diodes and a pull-up resistor configured to select the lowest headroom voltage and provide this as the headroom signal to the sampling module 1024. Each LED string may include at least one Schottky diode.

Figure 12:
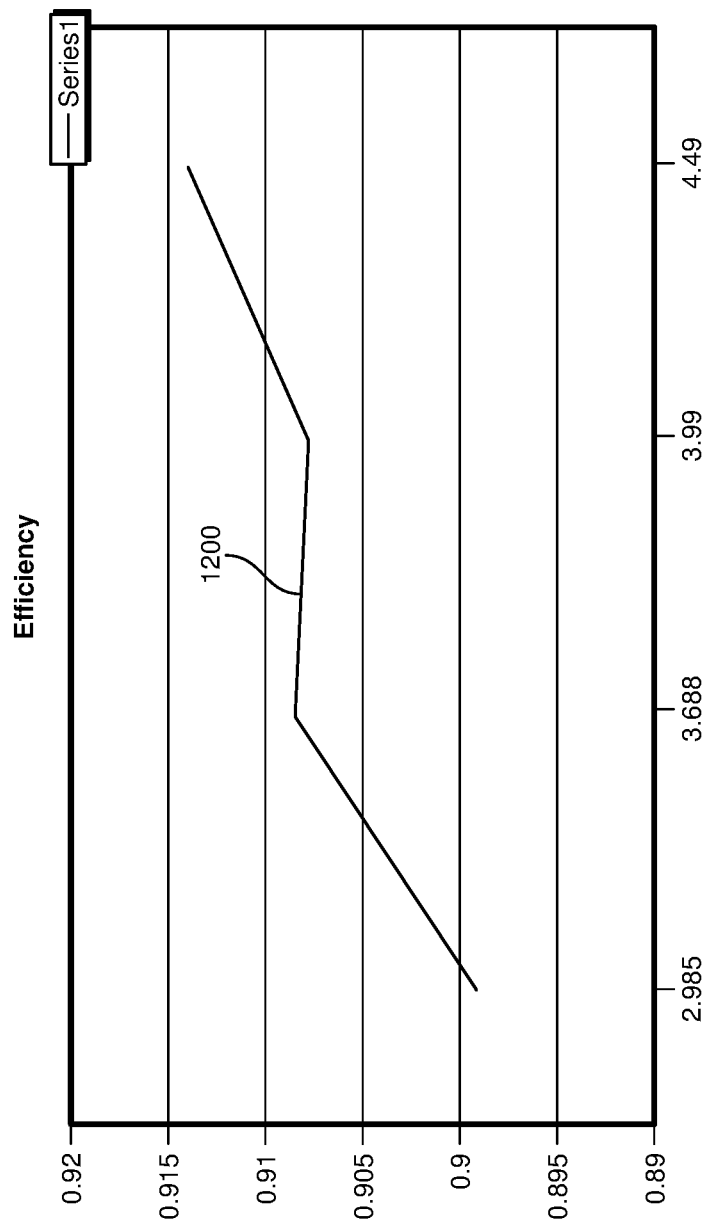
FIG. 12 shows example power efficiencies obtained as a function of device input voltage for a driver circuit similar to that shown in FIG. 10.

FIG. 12 shows example power efficiencies 1200 plotted as a function of device input voltage for a driver circuit similar to that shown in FIG. 10. In this example, efficiencies of at least 90% are obtained over a range of input voltages.

Figure 13:
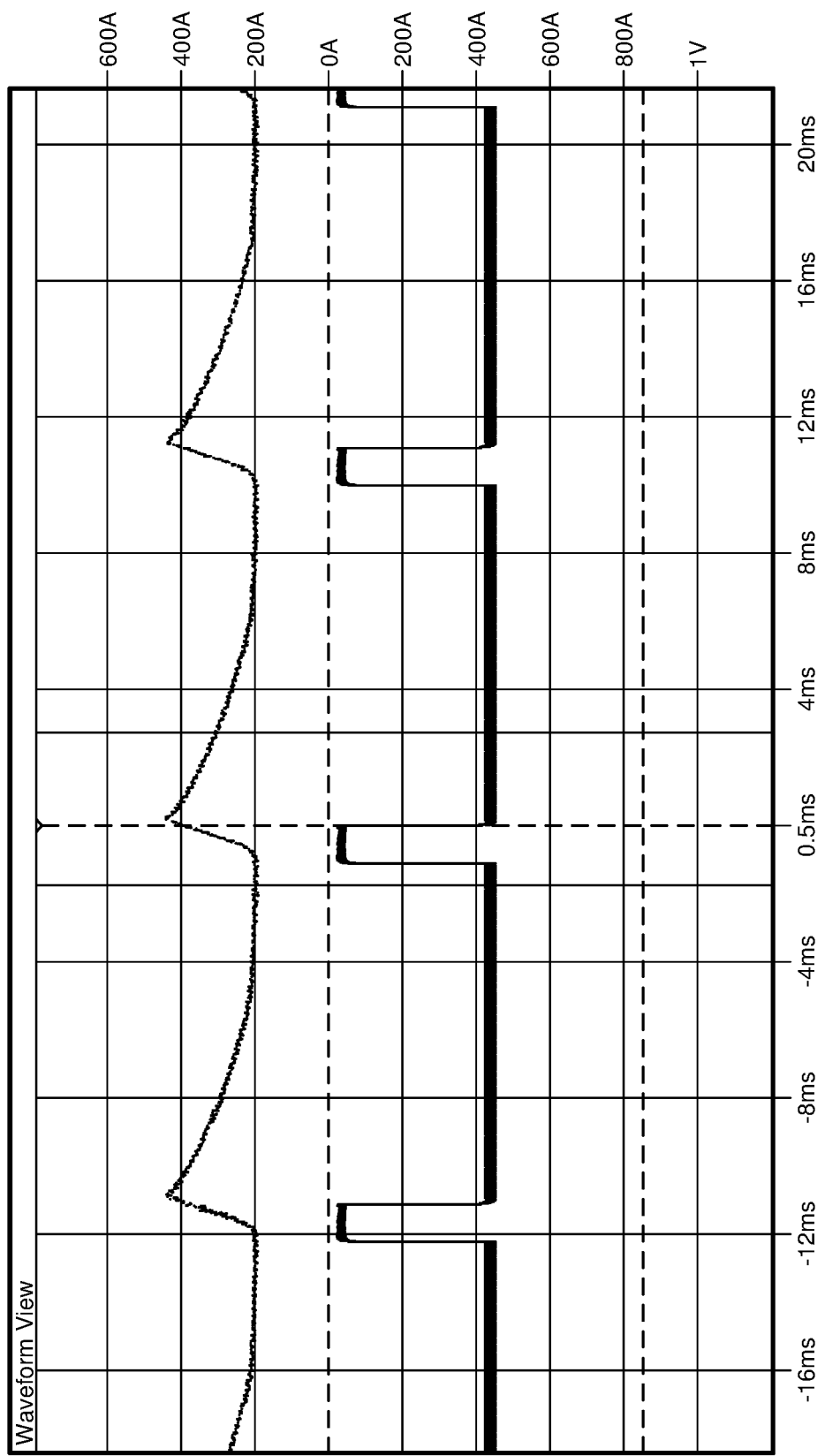
FIG. 13 shows example input currents for a driver circuit similar to that shown in FIG. 10.

FIG. 13 shows example input current and pulse modulation signals for a driver circuit similar to that shown in FIG. 10. In this example, the abscissa represents time and the ordinate represents arbitrary values. The pulsed modulation creates ripple in the input current.

Figure 14:
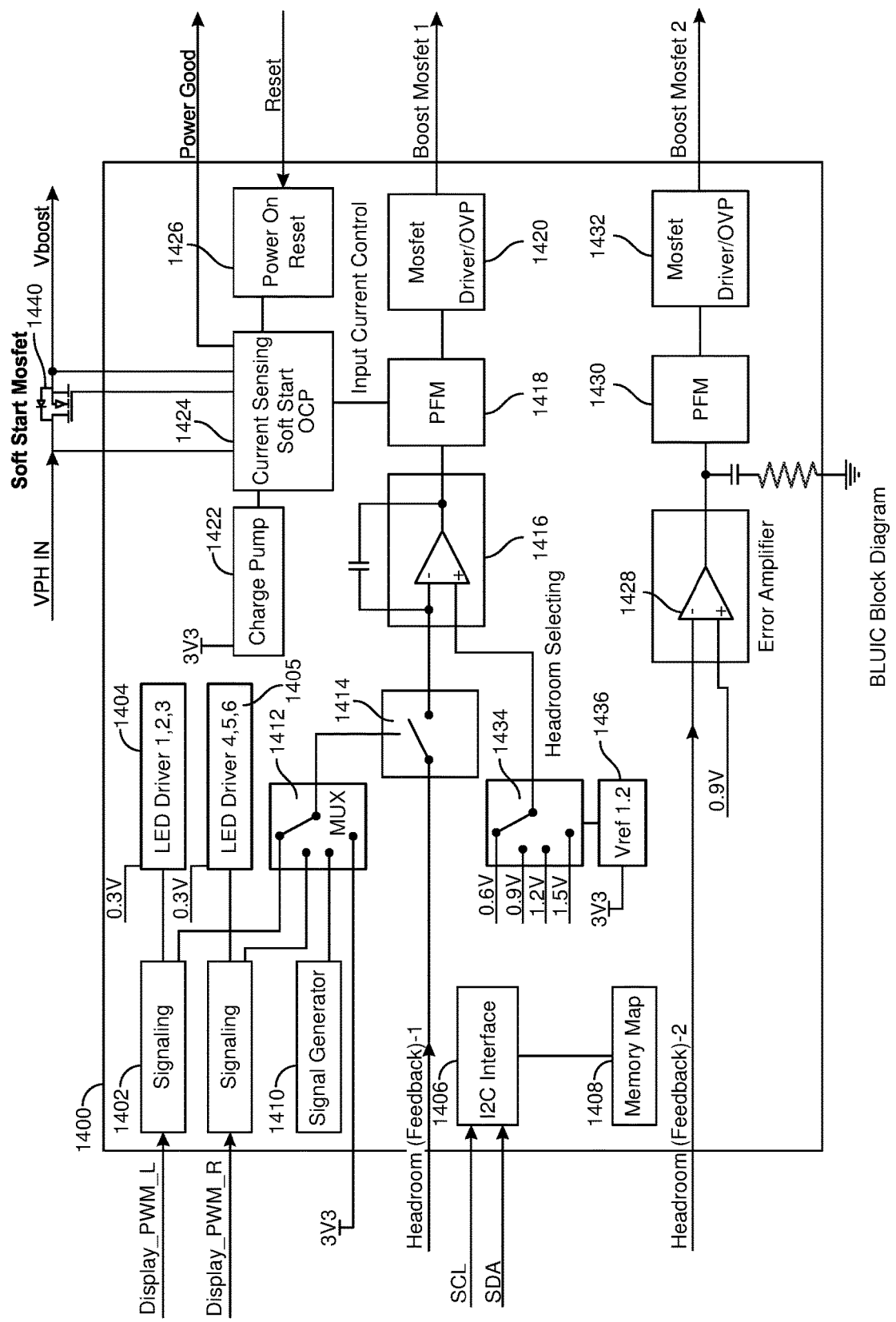
FIG. 14 shows a further example driver circuit, that may be implemented in an integrated circuit, including an analog pulse frequency modulation controller and headroom processing.

FIG. 14 shows a further example driver circuit 1400 that may be implemented as a circuit board or as an integrated circuit. The driver circuit 1400 includes signaling block 1402, LED drivers 1404 and 1405, 12C interface 1406, memory map 1408, signal generator 1410, multiplexer 1412, selector 1414, comparator 1416, pulse frequency modulation controller 1418, first boost transistor driver 1420, charge pump 1422, current sensing soft-start controller 1424, power-on reset control 1426, error amplifier 1428, pulse frequency modulator 1430, second boost MOSFET driver 1432, headroom selector 1434, and reference voltage 1436.

A soft-start transistor (e.g., MOSFET 1440) may reduce the rate of increase of the current to the circuit. The MOSFET 1440 may receive a signal from a current sensing soft-start over-current protection (OCP) module 1424, which in turn may receive a reset signal (e.g., from a user or device controlled reset), a charge pump (e.g., an incrementing voltage), and an input current control signal (e.g., that may receive a signal from pulse frequency modulation (PFM) circuit 1418, which may be based on the average current requirements of the BLU). The input current control provided by the soft-start MOSFET allows the input power factor to be increased from approximately 0.9 to approximately 0.99. The soft-start transistor (e.g., a MOSFET) may have one or more of the following functions: the transistor may function as an over-current protection (OCP) switch; the transistor may function as the main soft-start component; and, using a MOSFET, the circuit may use $R_{DS\text{-}ON}$ (drain-source resistance in an on state) for the MOSFET to sense the input current. In addition, a signal based on the input current may provide negative feedback to decrease the input current ripple.

In some examples, the BLU may be divided into two portions, for example, corresponding to left and right eyes, which may be denoted first and second portions. For a BLU with 6 LED strings, one portion may include first, second, and third strings driven by a first LED driver 1404, and fourth, fifth, and sixth strings driven by a second LED driver 1405. Other suitable configurations may be used with other numbers of LED strings (such as 4). In some examples, there may be two voltage boost circuits (e.g., one for each BLU portion), including first and second boost transistors (MOSFETs 1 and 2) driven by first and second transistor drivers, such as first and second MOSFET drivers 1420 and 1432. The MOSFETs may be located separately from the driver circuit shown in FIG. 14, for example, with the BLU or on separate heatsinks. However, in some examples, the MOSFETs may be considered to be part of the driver circuit. The boost transistors may be each driven by PFM circuits (such as 1418 and 1430 respectively). The PFM circuits may be adjusted based on received headroom signals from respective portions of the BLU. In some examples, one or both PFM circuits may be adjusted by comparison of a headroom signal with a selectable headroom voltage adjustable using a headroom selector (e.g., headroom selector 1434).

A serial interface, such as inter-integrated circuit (I2C) interface 1406, may receive SCL (serial clock) and SDA (serial data) signals, for example, from a remote controller. Data may be stored in memory (e.g., memory map 1408), such as data relating to BLU brightness levels, BLU pulse modulation data, and the like). The selector 1414 allows adjustment of the PFM 1418 based on a signal from multiplex switch 1412 or based on a headroom signal. A similar arrangement may be present in the input of error amplifier 1428. Multiplex switch 1412 may select signals from a signal generator 1410, or a signal based on the input drive signal as received by one of the signaling blocks, such as signaling block 1402.

Figure 15:
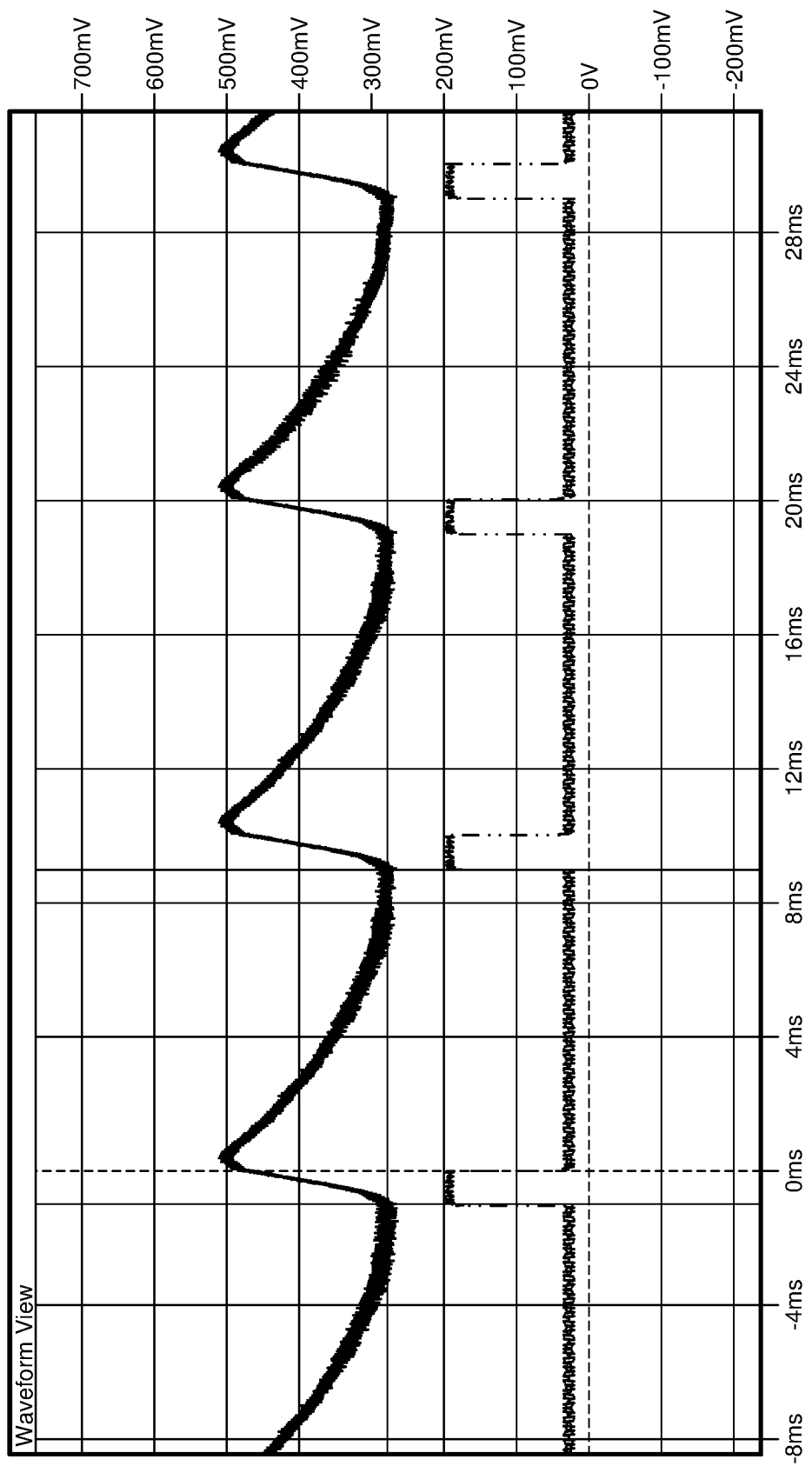
FIG. 15 shows example input currents for an example driver circuit without the soft-start transistor shown in FIG. 14.

FIG. 15 shows an example input current including input ripple for a driver circuit without a soft-start MOSFET. The upper trace is the input current waveform, with voltage sensed using a 0.01 ohm resistor and amplified 100 times. The measured input current ripple was 236 mA. The lower trace (with generally square pulses) is the BLU drive signal. The BLU is a pulsed load that induces a degree of current ripple on the input current.

Figure 16:
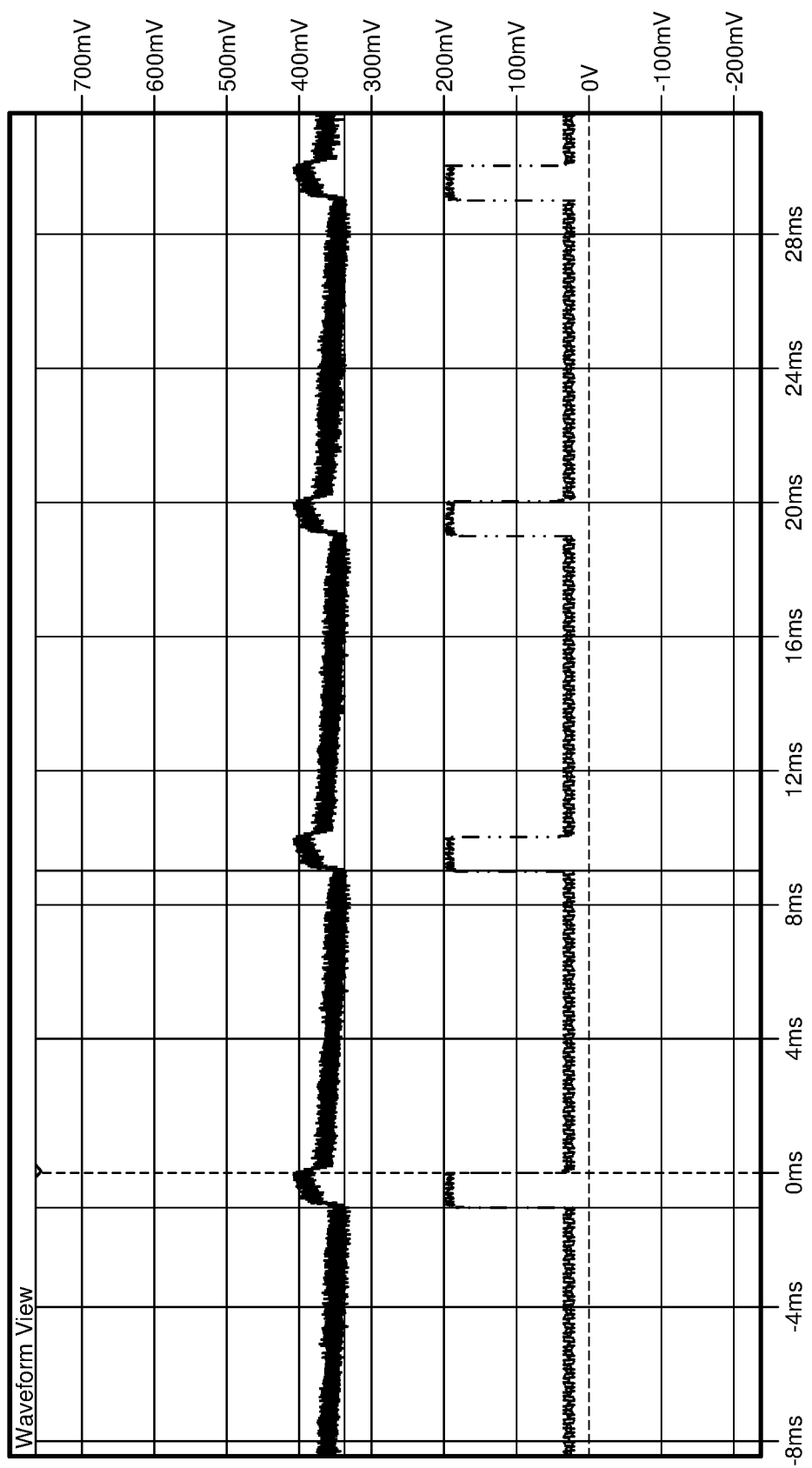
FIG. 16 shows example input currents with peak-to-peak ripple reduced using a soft-start transistor.

FIG. 16 shows example input currents with the peak-to-peak ripple reduced using a soft-start MOSFET, such as shown in FIG. 14. The upper trace is the input current waveform (sensed in a manner similar to that shown in FIG. 15). The current ripple was 79 mA, which is a considerable reduction relative to that shown in FIG. 15. The lower trace (with generally square pulses) is the BLU drive signal. The current ripple was reduced, compared to that shown in FIG. 15, using a soft-start circuit, such as the MOSFET-based circuit shown in FIG. 14. The soft-start circuit may be configured to decrease the input current ripple and improve the input power factor. The $R_{DS-ON}$ (drain-source resistance in the ON state) of the soft-start MOSFET may be used to sense the input current, and after a gain of, for example, 20, the input current ripple voltage may be provided to the PFM module to control the PFM. For example, the relative length of the low time (or off time) of the PFM signal may be adjusted, which may correspond to an adjustment of duty cycle. As the current increases, the duty cycle may be decreased. This negative feedback may help lower the input current ripple, thus improving the input power factor.

Figure 17:
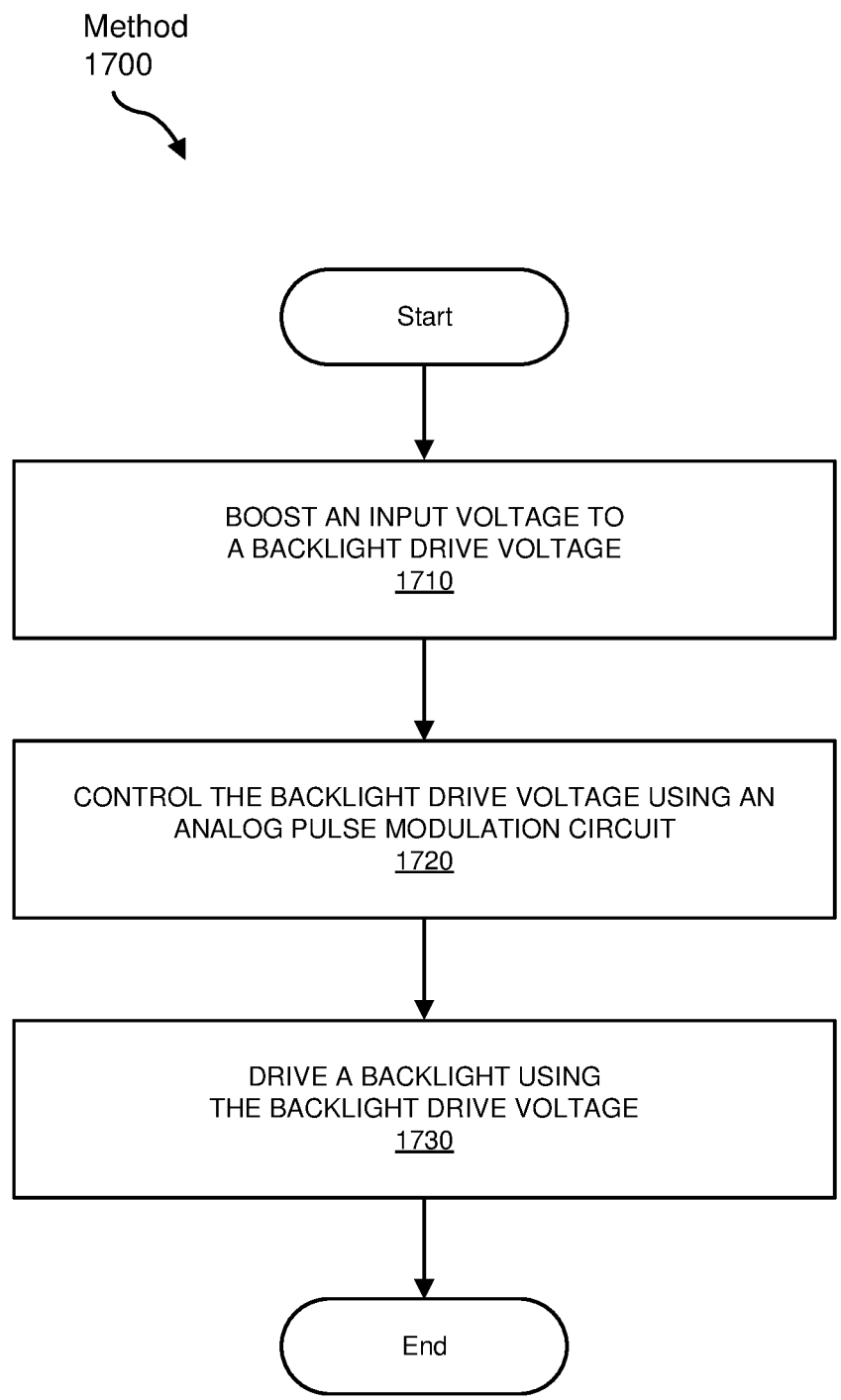
FIGS. 17 and 18 illustrate example methods of driving a BLU using a boost voltage.

FIG. 17 illustrates an example method of driving a BLU. The method may include boosting an input voltage to a backlight voltage (1710), controlling the backlight drive voltage using an analog pulse modulation circuit (1720), and driving the backlight using the backlight drive voltage (1730). Boosting the input voltage may also be referred to as stepping up the voltage, and may be achieved using a voltage boost circuit including a switchable semiconductor device (e.g., a transistor), and one or more of capacitors and/or inductors.

FIG. 18 illustrates a further example method of driving a BLU. The method includes generating a backlight voltage using a voltage boost circuit controlled by a pulse modulation circuit (1810), driving the backlight using the backlight voltage (1820), and adjusting the backlight voltage using a headroom signal (1830). For example, the pulse modulation signal may be adjusted based on the headroom signal.

FIGS. 17 and 18 may represent flow diagrams of exemplary computer-implemented methods. The steps shown may be performed by any suitable computer-executable code and/or computing system, including the system of FIG. 1 or 2B. In some examples, each of the steps shown in FIGS. 17 and 18 may represent an algorithm whose structure includes and/or may be represented by multiple sub-steps.

In some examples, a method may include: receiving a device input voltage; stepping up the device input voltage to a boost voltage; and providing the boost voltage and a drive signal to a backlight unit (BLU). The drive signal may allow global and/or local dimming of the BLU. The boost voltage may be generated using a PWM or PFM circuit in combination with at least one semiconductor device (e.g., a diode or transistor), and at least one of a capacitor or an inductor.

In other examples, a method may include: receiving a device input voltage; stepping up the device input voltage to a boost voltage; and providing the boost voltage and a drive signal to a backlight unit (BLU). Example methods may be performed by an electronic circuit; for example, an electronic circuit associated with a head-mounted device such as an AR/VR device. Example methods may be performed, at least in part, by a device controller including one or more physical processors. A device controller may include a driver circuit, such as described herein.

In some examples, a system may include at least one physical processor and physical memory including computer-executable instructions that, when executed by the physical processor, cause the physical processor to perform a computer-implemented method. In some examples, a non-transitory computer-readable medium includes one or more computer-executable instructions that, when executed by at least one processor of a computing device, cause the computing device to perform a computer-implemented method such as described herein, for example, in relation to FIG. 17 or 18.

In some examples, a BLU may include a plurality of LED strings; for example, between 2 and 20 LED strings. In a representative example, there may be six LED strings. Each LED string may include a plurality of LEDs, such as six LEDs. In some examples, an LED string may include a plurality of LED packages, and there may be two or more LEDs in each LED package. The total forward voltage required to drive an LED string may be between approximately 20 V and approximately 40 V, such as between approximately 25 V and approximately 35 V, for example, between approximately 28 V an approximately 30 V. In some examples, the LED strings may be arranged in a parallel electrical configuration. In some examples, LED strings may include one or more LEDs arranged in a series electrical configuration. In some examples, an LED symbol represented in a figure may represent an LED package including one or more LEDs that may be arranged in parallel and/or in series within the LED package. In some examples, the BLU drive current may be between 5 mA and 120 mA per LED string. A driver circuit may output left and right display PWM signals, and these may have a flexible phase shift. For example, the phase of the left display signal may be adjustable relative to the right display signal. The relative phase may be adjusted, for example, to reduce instantaneous current demands on a battery. LED strings may have similar drive currents, and in some examples string-to-string current variations may be less than 10%, such as less than 5%, less than 3%, etc.

In some examples, a PWM drive signal may have a frequency of 60-120 Hz, and may have a duty cycle of between approximately 5% and approximately 20%, such as approximately 10%. The battery voltage ($V_{bat}$) may be between approximately 3 V and approximately 4.5 V. A soft-start MOSFET may be used to limit inrush current to less than 1 A. A circuit may have short circuit protection that may limit the short circuit current to less than 3 A, such as between 2 A and 3 A.

A number of example driver circuits were made, such as those discussed above. These example driver circuits may have various combinations of attributes. A first example driver circuit (similar to that of FIG. 3) included a digital PWM control mode, no loop compensation, and a digital feedback loop (implemented using firmware). The quiescent current was high (compared with other example circuits), which may be due to the digital feedback loop. A digital circuit may include a large number of transistors, which even if individually have a low quiescent current, may in a digital circuit contribute to a high device quiescent current. Boost efficiency for an input voltage of 3.7 V was 82.9%. Input power factor was 99%, which was excellent.

A second example circuit (similar to that of FIG. 6) included an analog PWM control mode, loop compensation using source current sensing, and a feedback loop including an analog error amplifier. The quiescent current was low (compared to other examples), possibly due to the analog feedback loop circuit. The boost efficiency at 3.7 V was 83.7%, and the input power factor was 0.32. The input power factor of this example circuit may be considered as unacceptably low.

A third example circuit (also based on a circuit similar to FIG. 6) included an analog PWM control mode, loop compensation using drain current sensing, and a feedback loop including an analog error amplifier. The quiescent current was low (relative to other examples), the boost efficiency was 87% for a 3.7 V input voltage, and the input power factor was 32%, which may be considered as unacceptably low.

A fourth example circuit (similar to that of FIG. 10) included an analog PFM control mode, no loop compensation, and a feedback loop including sampling and a pulse integrator using a mixed analog/digital circuit. This example circuit had excellent properties, with a low quiescent current (compared with other circuits, particularly with fully digital feedback loops), a boost efficiency of 91% for a 3.7 V input voltage, and an input power factor of approximately 0.9, varying between 0.85 and 0.95 under different conditions. The input power factor was increased to 0.99 after adding an input current control method (e.g., the soft-start MOSFET-based circuit discussed above in relation to FIG. 14).

In some examples, a driver circuit may use a PFM (pulse frequency modulation) approach that may provide advantages over a PWM (pulse width modulation) approach. In addition, the driver may include a pulse modulation controller that includes both analog digital components. In some examples, the pulse modulation controller may include a sample circuit and a pulse integrator circuit within a loop controller, compared to the error amplifier used in the second and third example driver circuits. In addition, the driver may use the $R_{DS-ON}$ of a soft-start MOSFET to sense the input current and provide an input current signal to the pulse modulation controller (e.g., including a PFM module) to greatly reduce the input current ripple. Example circuits may also include a headroom processing module configured to select the lowest headroom voltage from a plurality of headroom voltages (e.g., headroom voltages obtained from each of the LED strings) and provide a headroom signal based on the lowest headroom voltage to the pulse modulation controller (e.g., the sampling module of a pulsed modulation controller using PFM).

In some examples, a device may have an input power factor of at least 0.9. An input current may include an RMS (root mean square) ripple current component and a direct current component. The input power factor may be defined as the proportion of the input power originating from the DC (direct current) component. In some examples, the input power factor may be greater than 0.9, which may be expressed as greater than 90%, where an input power factor of 1 (100%) corresponds to negligible ripple with the input power being attributable to the direct component.

In some examples, a device may include a driver circuit including a voltage boost circuit configured to receive a device input voltage and provide a backlight voltage. The backlight voltage may be higher than the device input voltage, and the backlight voltage may be generated from the device input voltage by a step-up converter, which may also be referred to as a voltage boost circuit. The backlight driver may further include a PFM circuit or PWM circuit, which may be configured to control the step-up converter. In some examples, the PFM or PWM circuit may be configured to adjust the backlight voltage, for example, by adjusting the frequency and/or mark-space ratio of a signal. An example PFM circuit may include an analog PFM controller and/or an analog integrator circuit.

An example step-up converter may include a diode or other semiconductor device (e.g., a transistor) and at least one of a capacitor or an inductor. A transistor may operate as a switch turned on at intervals using a pulse modulation signal.

The backlight voltage may be a voltage multiple of the device input voltage, and the voltage multiple may be between 2 and 16, such as between 4 and 10. These and other ranges may be approximate and/or may be inclusive.

The driver circuit may be configured to provide the backlight voltage and a backlight drive signal to a BLU. In some examples, the device may be an augmented reality device and/or a virtual reality device. In some examples, the device may be a head-mounted device. The device input voltage may be a battery voltage, and may be between approximately 3 V and approximately 6 V, such as between approximately 3 V and approximately 4.5 V. The backlight voltage may be at least 20 V, such as at least 24 V, and may be between approximately 20 V and approximately 40 V.

In some examples, the driver circuit may be configured to provide a drive signal to the BLU. The drive signal may allow local dimming of the BLU, for example, to increase the contrast ratio of the display. A device may include a liquid crystal display (LCD), with the BLU being associated with the LCD. In some examples, the driver may also provide a drive signal to the LCD, though in some cases a separate display driver may be used. A device controller may include a driver circuit (e.g., including a voltage boost circuit) and display drivers configured to drive a display panel associated with the backlight. Pulse modulation of the BLU illumination may be controlled, allowing the BLU brightness to be controlled. In some examples, a device may include a controller configured to control the backlight voltage and provide a drive signal to the BLU. The drive signal may allow global dimming and/or local dimming of the BLU. Global dimming may act as an overall brightness control for the display. In addition, local dimming may reduce the intensity of a portion of the BLU corresponding to a relatively lower brightness portion of the displayed image.

In some examples, a device including a driver circuit may have one or more of the following output features. The driver circuit may provide a boost voltage to a number of emissive devices, such as LEDs. The LED configuration may include one or more strings, which may include one or more LEDs (e.g., LED packages) arranged in series. In some examples, there may be 4 LED strings, though the number is not limited by this example. In some examples, there may be one or more LEDs in each LED package, such as 1-16 LEDs; for example, 2 or 4 LEDs in each LED package. The total forward voltage (e.g., BLU drive voltage) and/or output current (e.g., BLU drive current) may be determined by the number and/or configuration of LEDs. The forward voltage may be in the range of 14 V to 60 V, such as in the range of 28 V to 30 V. In some examples, the output current may be in the range of 5-120 mA per output string (e.g., LED string). In some examples, the display PWM signals (left and right, L and R) may have a flexible phase shift. In some examples, the current variation between LED strings may less than 10%; for example, less than 5%. The output current may have a maximum variation of 3%. A driver may include a direct PWM drive, 60-120 Hz, using a duty cycle in the range 5%-20%, such as approximately 10%.

In some examples, a device including a driver may have one or more of the following input features. The device input voltage ($V_{BAT}$, which may be a battery voltage or other power supply input voltage) may be between 3 V and 4.5 V. The device may have a soft start to limit the inrush current to below approximately 1 A. There may be a short circuit protection current of less than 3 A, such as between 2 A and 3 A. In some examples, the input power factor may be greater than 0.9, where the input power factor may be on the power used by the circuit to that delivered to the circuit, and may be related to the ratio of the dc input current to the rms input ripple current ($I_{dc}/I_{rms}$ for input currents). Generally, the $I_{rms}$ component does not contribute to the power used by the circuit, so as the $I_{rms}$ component increases the power factor falls.

In some examples, a backlight driver may be configured for use with an augmented reality (AR) and/or virtual reality (VR) system. In some examples, a device may have an efficiency of over 80%, such as over 90%. The size of any inductors may be reduced for lower weight and/or volume. A device may be configured to have no audible noise or vibration. In some examples, a circuit may not use ceramic capacitors.

An example BLU configuration may include one or more LED strings, such as 4 LED strings. Each LED string may include one or more LEDs, such as 4 LEDs. Each LED string may be driven by a BLU drive voltage ($V_{BLU}$), which may be a boosted voltage relative to the device input voltage ($V_{BAT}$). In some examples, a PWM circuit may be used (e.g., in conjunction with one or more capacitor and inductors) to boost the device input voltage ($V_{BAT}$) to a higher boost voltage ($V_{BOOST}$), which may be some multiple of $V_{BAT}$. For example, the multiple (which may be termed a voltage multiplier) may be between 2 and 32, such as between 2 and 16, between 4 and 16, or between 5 and 10. The BLU drive voltage may be approximately equal to or otherwise based on the boost voltage. For example, the device input voltage may be between 3 V and 5 V, and the boost voltage may be between 25 V and 35 V. In some examples, a backlight driver may include a digital PWM controller, which may modulate the drive voltage applied to the BLU. In implementation, an example backlight driver reached a boost efficiency higher than any previously obtained value.

Each LED string may also have an associated constant current driver. The duty cycle (which may also be referred to as the duty ratio) may be adjustable and may be in the range of 5%-20%. A drive signal, which may have an adjustable duty cycle, may be received from the driver, and may be used to control the constant current drivers.

An example driver circuit may include a PWM controller (e.g., a digital PWM controller), an accumulator (e.g., provided by a CPU), a loop gain adjustment, and an ADC (analog-to-digital converter). The ADC output may be used for headroom processing for the BLU LEDs. In some examples, a display driver may provide a drive signal, such as a PWM signal to one or more of the constant current drivers, illuminating the respective LED strings. Each LED string may have an associated constant current driver. The constant current drivers may be components of the BLU, may be integrated with the driver circuit, or otherwise configured within the device (e.g., within a separate circuit configured to provide drive signals to the constant current drivers to illuminate the LED strings).

In some examples, devices operated using PWM show a much greater input power factor (e.g., an input power factor of greater than 0.9) using digital PWM compared with analog PWM devices (which may show an input power factor of less than 0.5). Devices using digital PWM may provide excellent efficiency and input power factor without using loop compensation. The feedback loop may use a digital circuit, which may be implemented as firmware.

In some examples, efficiencies of over 80% were obtained with example driver circuits including a digital PWM circuit. In some examples, an input power factor of greater than 0.9 was also obtained. For example, an efficiency of 82.9% was obtained for a device input voltage ($V_{BAT}$) of 3.7 V. In some examples, an input power factor of 0.99 was obtained, which is a remarkably excellent operating parameter. In some examples, source current sensing and/or drain current sensing may be used.

A PWM controller may operate at a generally fixed frequency that may be greater than an audibly perceptible signal for a typical (or demographically typical) user. For example, the PWM frequency may be above 20 kHz, or above 25 kHz, or above 30 kHz.

In some examples, a driver may include an analog pulse frequency controller (PFM) controller, an integrator, a sampling circuit, and a headroom processing circuit. The headroom processing circuit may receive signals from the sampling circuit. An example PFM circuit may adjust on-times and/or off-times, and may use a fixed on-time or fixed off-time approach. An example PFM circuit may be used with one or more capacitors and inductors to boost the device input voltage ($V_{BAT}$) to provide a boost voltage ($V_{BOOST}$) to the BLU. The BLU drive voltage ($V_{BLU}$) may then be at least approximately equal to the boost voltage. In some examples, the frequency may have a minimum frequency, and the minimum frequency may be greater than an audibly perceptible signal for a typical (or demographically typical) user. For example, the frequency may be maintained above 20 kHz, or above 25 kHz, or above 30 kHz.

In some examples, a device using PFM exhibited an efficiency greater than 90% for a range of device input voltages. For example, an example device had an efficiency of 90.8% for a device input voltage of 3.7 V.

Devices including a PFM circuit may obtain excellent input power factor and efficiency operating parameters. Example drivers include an analog PFM circuit (e.g., a PFM circuit including one or more analog components). In some examples, a combination of analog and digital approaches or a fully digital PFM may be used. In some examples, a PFM circuit may have a lower gain than a PWM circuit, allowing circuit stabilization components to be omitted, reducing the quiescent current demands.

An example device may include a BLU, and the BLU may include a plurality of emissive elements, such as an arrangement of LEDs. For example, LEDs may be arranged in an array. An emissive element may include a single LED or a plurality of LEDs. In some examples, an LED may include a plurality of emissive elements (e.g., a white LED including a plurality of emitters). In some examples, a BLU may include a plurality of white-light emissive devices, such as white light-emitting diodes (LEDs). For example, a BLU may include an arrangement of white light emitting LEDs (white LEDs). In some examples, a BLU may include color emitting LEDs, such as red, orange, yellow, green, or blue LEDs.

In some examples, a driver circuit may be used to control a BLU associated with a liquid crystal display (LCD) panel. The BLU may have an adjustable overall intensity. In some examples, portions of the BLU may be selectively dimmed. For example, a driver may receive a display signal (e.g., a video signal) and analyze the display signal to determine if portions of the BLU may be selectively dimmed. In some examples, a controller (e.g., including one or more processors) may perform analysis of the display signal and send local dimming controls to the driver.

In some examples, driver circuits as described herein may be configured to control emissive displays directly, for example, electroluminescent displays such as organic or inorganic LED displays. The drive signals may be adapted to the emissive technology and emissive element arrangement. The step-up circuits (also referred to as voltage boost circuits) described herein may be used to generate a boost voltage ($V_{BOOST}$) used to drive an emissive display. A device may include a driver as described herein, and an emissive display such as an LED display, and the emissive display may receive a drive signal and a boost voltage from the driver. The driver may include a step-up converter.

In some examples, a driver may include a step-up converter configured to provide a higher direct voltage to the BLU (sometimes referred to as a backlight voltage $V_{BLU}$ or $V_{BOOST}$) than the device input voltage (e.g., the voltage provided by the device power supply such as the battery voltage $V_{BAT}$). The step-up converter may be also be referred to as a boost circuit, and the stepped-up voltage may be referred to as the boost voltage. A boost circuit may include an active semiconductor device (such as a transistor or diode) along with a capacitor and/or an inductor. Various configurations of step-up converters may be used. An example step-up converter includes a diode, a capacitor, and an inductor. An additional capacitor may be provided at the output of the step-up converter to reduce voltage ripple.

The diode (or other semiconductor device such as a transistor) may be effectively turned on and subsequently turned off in an alternating fashion under the control of a PWM or PFM circuit. This may result in periodic energy storage and release in the inductor and/or the capacitor.

A step-up converter may convert an input direct voltage and an input direct current to a output direct voltage and an output direct current. The output direct voltage may be greater than the input direct voltage by a multiplier that may also be termed a voltage multiplier. The voltage multiplier may be between approximately 4 and approximately 16. The input current may be greater than the output current by at least a similar multiplier.

An inductor may include a coil of wire wound around a ferromagnetic core, such as an ferromagnetic metal core, ferrite core, or other magnetic core. Any suitable inductor configuration may be used. Energy may be stored and released from magnetic field lines generated when current is passed through the inductor. A step-up converter may be controlled, for example, by a PFM or PWM circuit. In some examples, a PFM or PWM circuit may be used to control the output voltage of the step-up converter (e.g., the boost voltage on which the BLU drive voltage may be based).

In some examples, a device may include one or more of the following: one or more physically small inductors (e.g., to reduce the weight of the device) and/or no components susceptible or producing an audible noise and/or a perceptible vibration (e.g., no ceramic capacitors).

In some examples, s capacitor may generate a perceptible vibration (e.g., an acoustic signal) related to the frequency of an applied electrical signal. In some examples, a capacitor (e.g., a ceramic capacitor) may be configured so that any vibration (e.g., due to a piezoelectric effect) is not mechanically coupled to the circuit board. For example, a capacitor may be mounted on a flexible element or other element configured to prevent or reduce mechanical coupling from the capacitor to the circuit board (e.g., a resilient, elastic and/or flexible capacitor mount). Example capacitor mounts may help decouple mechanical deformation of the capacitor from deformations of the circuit board, for example, using flexible and/or expandable capacitor mounts. In some examples, a pair of capacitors may be mounted, packaged, and/or driven so that an expansion of one capacitor dielectric is approximately matched by the compression of the other capacitor dielectric. A combination of capacitor elements may be arranged within a single package so that the package as a whole is not subject to expansion or compression, for example, due to compensatory expansions and compressions of the capacitor elements. In some examples, non-ceramic capacitors may be used, such as tantalum or film capacitors.

In some examples, a device may include a driver configured to receive a device input voltage and provide a backlight voltage, where the backlight voltage is higher than the device input voltage, and the backlight voltage is generated from the device input voltage by a step-up converter. The driver may include a pulse modulation circuit (PM circuit). The PM circuit may be configured to control the step-up converter, and may be configured to adjust the backlight voltage. The PM circuit may include an analog PM controller, and may include an analog integrator circuit. The backlight voltage may be a voltage multiple of the device input voltage, where the voltage multiple may be between 2 and 30 (e.g., between 2 and 20, or between 4 and 16). The device input voltage may be a battery voltage, such as a voltage from a lithium-ion battery. In some examples, the step-up converter may include a diode, a capacitor, and an inductor. The device input voltage may be between approximately 3 V and approximately 6 V, such as between approximately 3 V and approximately 4.5 V. The backlight voltage may be at least 20 V, such as between approximately 20 V and approximately 40 V.

An example BLU driver may be further configured to provide the backlight voltage and a backlight drive signal to the BLU of a device. In some examples, the device may an augmented reality device and/or a virtual reality device. In some examples, the device may be a head-mounted device. The BLU may include a plurality of light-emitting diodes, or other light emissive elements. The driver may be configured to provide a drive signal to the BLU. The BLU may be associated with a LCD, so that light from the BLU passes through the LCD. A controller may be configured to control the backlight voltage and provide a drive signal.

In some examples, a driver may use PFM or PWM operating modes according to the driver current required, and may be switched between modes as the driver current varies. For example, a driver may be configured to use PFM below a threshold drive current. For example, a device may switch between a digital PWM mode and a digital PFM mode.

In some examples, a device may receive demographic information from a user, such as age and/or gender. In some examples, the demographic information may be used to determine a minimum frequency for PWM and/or PFM modulation; for example, based on exceeding an estimated highest audible frequency for the user.

In some examples, a BLU driver as described herein may achieve an improved efficiency compared with a conventional BLU driver. In some examples, a BLU driver may include a PFM based circuit. A BLU driver may include a mixed analog and digital circuit (e.g., including a sample circuit and pulse integrator circuit) as the loop controller. An example BLU driver may omit an error amplifier while maintaining improved performance.

In some examples, a custom integrated circuit (IC) may be fabricated and configured to implement improved driver circuits as described herein. An improved integrated circuit may be fabricated to implement one or more BLU drivers or to provide a display driver also configured to provide a higher emissive display drive voltage than the device input voltage (e.g., the battery voltage).

An example driver including an analog PFM circuit showed excellent performance, and had a measured boost efficiency of 90.8%. Example devices may have a boost efficiency of over 90%. Virtual reality (VR) is an example application, but is not limiting.

An example device may include one or more displays, such as one or more liquid crystal displays, along with a BLU and associated electronic circuits. Higher efficiency BLUs are desirable to reduce power consumption and to increase the battery life of portable devices. Examples include high-efficiency BLUs, BLU driver circuits, devices or systems including a BLU, methods of driving a BLU, methods of fabricating a device including a BLU, and other methods and apparatus. Examples include display devices, such as battery-powered devices including a BLU. Example devices may include augmented reality and/or virtual reality devices. A device may include a BLU in combination with an LCD panel configured to provide virtual reality and/or augmented reality image elements to a user when the user wears the device.

In some examples, a BLU driver may include a step-up converter (or voltage boost circuit) that provides a higher voltage to the BLU than the voltage received by the driver. For example, the driver may receive a lithium-ion battery voltage of approximately 3.7 V and provide a voltage of approximately 30 V to the BLU. A PFM or PWM circuit may be used to control the step-up converter, for example, in combination with a semiconductor device such as a diode, a capacitor, and an inductor. An example PFM circuit allowed a remarkably high voltage boost efficiency of over 90%. In some examples, an example PFM circuit may include an analog PFM controller and/or an analog integrator circuit. An example method may include receiving an input voltage, stepping up the input voltage to a boost voltage, and providing the boost voltage and a drive signal to the BLU. Applications include displays used in head-mounted displays, such as AR/VR devices.

In some examples, an example backlight driver circuit may drive an LED-based backlight unit (BLU), for example, within a virtual reality (VR) or augmented reality (AR) device. The driver circuit may include a voltage booster which may receive a voltage in the range 3 V-5V, such as approximately 3.7 volts from a lithium-ion battery, and provide a boosted output voltage (which may also be referred to as a boost voltage), for example, in the range 20 V-40 V (e.g., 25 V-35 V) to drive the BLU. The circuit may also provide a signal to drive the LEDs, and the duty cycle may be in the range 5%-20% (e.g., approximately 10%). Examples may include a PFM-based voltage booster having analog circuit elements that may work with various BLU configurations. Circuit efficiency may be particularly useful for battery powered applications, and may be increased using a pulse frequency modulation (PFM) circuit using analog (e.g., rather than digital) circuit elements. A PFM circuit may be more efficient than a pulse width modulation (PWM) circuit, as the feedback loop may have lower gain and additional circuit stabilization components may not be needed. Analog circuitry may be appreciably more efficient that digital circuitry, for example, due to the reduced number of active components. A digital circuit allows may more flexibility, but a typical microcontroller includes thousands of transistors and may draw more power. Analog components may be used for elements of a PWM control circuit, such as sampling and pulse integrator elements. Example circuits may also have an improved input power factor, indicating a reduced fluctuating (e.g., oscillatory) component of the input current. This may reduce power losses, for example, along transmission lines. Batteries, such as lithium ion batteries, may show improved performance with reduced fluctuating components in the input current to the circuit. An example VR BLU may include 2-16 strings (e.g., 2-4 strings) of LED modules, and each LED string may include a number of LED modules (e.g., 2-8 LED modules such as 4 LED modules) in series in each LED string. In some examples, an LED module may include a plurality of LEDs (e.g., 2-4 LEDs) in series. In some example configurations, the drive voltage for an LED string may be at least 8 times that for a single LED. Examples include a BLU drive circuit having a PFM-based voltage booster and analog component elements that may be used with various BLU configurations, such as battery-powered applications including AR/VR devices.

EXAMPLE EMBODIMENTS

Example 1. An example device may include a backlight unit including an arrangement of light-emissive elements, and a driver circuit including a voltage boost circuit configured to receive a device input voltage and generate a backlight drive voltage and a pulse modulation controller configured to provide a pulse modulation signal to the voltage boost circuit, where the backlight drive voltage is appreciably higher than the device input voltage.

Example 2. The device of example 1, where the pulse modulation controller includes an analog circuit.

Example 3. The device of any of examples 1 or 2, where the pulse modulation controller is a pulse frequency modulation controller.

Example 4. The device of any of examples 1-3, where the pulse modulation controller is a pulse width modulation controller.

Example 5. The device any of examples 1-4, where the device input voltage is between 3 V and 4.5 V, and the backlight drive voltage is between 20 V and 40 V.

Example 6. The device of any of examples 1-5, where the voltage boost circuit includes a transistor, and the transistor is configured to receive the pulse modulation signal.

Example 7. The device of any of examples 1-6, where the voltage boost circuit further includes at least one capacitor and at least one inductor.

Example 8. The device of example 6, where the transistor is a MOSFET, and the pulse modulation controller is further configured to receive a soft-start signal based on a drain-source resistance of the MOSFET and reduce an input current ripple using the soft-start signal.

Example 9. The device of any of examples 1-8, where the arrangement of light-emissive elements includes light-emitting diodes (LEDs).

Example 10. The device of example 9, where the LEDs are arranged in a plurality of LED strings, and the plurality of LED strings are arranged in a parallel electrical configuration.

Example 11. The device of example 10, where each of the plurality of LED strings has an associated constant current driver.

Example 12. The device of any of examples 1-11, where the device further includes a headroom processor configured to receive a plurality of headroom voltages from the backlight unit and to provide a headroom signal.

Example 13. The device of example 12, where the headroom processor is further configured to select a lowest headroom voltage from the plurality of headroom voltages, and the headroom signal is based on the lowest headroom voltage.

Example 14. The device of any of examples 1-13, where the pulse modulation controller is configured to adjust the backlight drive voltage based on the headroom signal.

Example 15. The device of any of examples 1-14, where: the device further includes an electronic display associated with the backlight unit; and the device is configured so that light from the backlight unit passes through at least a portion of the electronic display.

Example 16. The device of any of examples 1-15, where the device is a head-mounted device.

Example 17. The device of any of examples 16, where the device is an augmented reality device or a virtual reality device.

Example 18. An example method may include receiving a device input voltage, boosting the device input voltage to obtain a backlight drive voltage, and driving a backlight unit using the backlight drive voltage, where the backlight unit includes an arrangement of light-emitting diodes (LEDs) and boosting the device input voltage includes obtaining a pulse modulation signal from an analog pulse modulation circuit.

Example 19. The method of example 18, where the arrangement of LEDs includes a plurality of LED strings, and the method further includes: obtaining headroom voltages from the plurality of LED strings; determining a headroom signal based on a lowest headroom voltage of the headroom voltages; and adjusting the pulse modulation signal based on the headroom signal.

Example 20. The method of any of examples 18 or 19, where receiving the device input voltage includes receiving the device input voltage from a battery.

Embodiments of the present disclosure may include or be implemented in conjunction with various types of artificial reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (such as, e.g., augmented-reality system 1900 in FIG. 19) or that visually immerses a user in an artificial reality (such as, e.g., virtual-reality system 2000 in FIG. 20). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 19, augmented-reality system 1900 may include an eyewear device 1902 with a frame 1910 configured to hold a left display device 1915(A) and a right display device 1915(B) in front of a user's eyes. Display devices 1915(A) and 1915(B) may act together or independently to present an image or series of images to a user. While augmented-reality system 1900 includes two displays, embodiments of this disclosure may be implemented in augmented-reality systems with a single NED or more than two NEDs.

In some embodiments, augmented-reality system 1900 may include one or more sensors, such as sensor 1940. Sensor 1940 may generate measurement signals in response to motion of augmented-reality system 1900 and may be located on substantially any portion of frame 1910. Sensor 1940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1900 may or may not include sensor 1940 or may include more than one sensor. In embodiments in which sensor 1940 includes an IMU, the IMU may generate calibration data based on measurement signals from sensor 1940. Examples of sensor 1940 may include, without limitation, accelerometers, gyroscopes, magnetometers, other suitable types of sensors that detect motion, sensors used for error correction of the IMU, or some combination thereof.

In some examples, augmented-reality system 1900 may also include a microphone array with a plurality of acoustic transducers 1920(A)-1920(J), referred to collectively as acoustic transducers 1920. Acoustic transducers 1920 may represent transducers that detect air pressure variations induced by sound waves. Each acoustic transducer 1920 may be configured to detect sound and convert the detected sound into an electronic format (e.g., an analog or digital format). The microphone array in FIG. 19 may include, for example, ten acoustic transducers: 1920(A) and 1920(B), which may be designed to be placed inside a corresponding ear of the user, acoustic transducers 1920(C), 1920(D), 1920(E), 1920(F), 1920(G), and 1920(H), which may be positioned at various locations on frame 1910, and/or acoustic transducers 1920(I) and 1920(J), which may be positioned on a corresponding neckband 1905.

In some embodiments, one or more of acoustic transducers 1920(A)-(J) may be used as output transducers (e.g., speakers). For example, acoustic transducers 1920(A) and/or 1920(B) may be earbuds or any other suitable type of headphone or speaker.

The configuration of acoustic transducers 1920 of the microphone array may vary. While augmented-reality system 1900 is shown in FIG. 19 as having ten acoustic transducers 1920, the number of acoustic transducers 1920 may be greater or less than ten. In some embodiments, using higher numbers of acoustic transducers 1920 may increase the amount of audio information collected and/or the sensitivity and accuracy of the audio information. In contrast, using a lower number of acoustic transducers 1920 may decrease the computing power required by an associated controller 1950 to process the collected audio information. In addition, the position of each acoustic transducer 1920 of the microphone array may vary. For example, the position of an acoustic transducer 1920 may include a defined position on the user, a defined coordinate on frame 1910, an orientation associated with each acoustic transducer 1920, or some combination thereof.

Acoustic transducers 1920(A) and 1920(B) may be positioned on different parts of the user's ear, such as behind the pinna, behind the tragus, and/or within the auricle or fossa. Or, there may be additional acoustic transducers 1920 on or surrounding the ear in addition to acoustic transducers 1920 inside the ear canal. Having an acoustic transducer 1920 positioned next to an ear canal of a user may enable the microphone array to collect information on how sounds arrive at the ear canal. By positioning at least two of acoustic transducers 1920 on either side of a user's head (e.g., as binaural microphones), augmented-reality device 1900 may simulate binaural hearing and capture a 3D stereo sound field around about a user's head. In some embodiments, acoustic transducers 1920(A) and 1920(B) may be connected to augmented-reality system 1900 via a wired connection 1930, and in other embodiments acoustic transducers 1920(A) and 1920(B) may be connected to augmented-reality system 1900 via a wireless connection (e.g., a BLUETOOTH connection). In still other embodiments, acoustic transducers 1920(A) and 1920(B) may not be used at all in conjunction with augmented-reality system 1900.

Acoustic transducers 1920 on frame 1910 may be positioned in a variety of different ways, including along the length of the temples, across the bridge, above or below display devices 1915(A) and 1915(B), or some combination thereof. Acoustic transducers 1920 may also be oriented such that the microphone array is able to detect sounds in a wide range of directions surrounding the user wearing the augmented-reality system 1900. In some embodiments, an optimization process may be performed during manufacturing of augmented-reality system 1900 to determine relative positioning of each acoustic transducer 1920 in the microphone array.

In some examples, augmented-reality system 1900 may include or be connected to an external device (e.g., a paired device), such as neckband 1905. Neckband 1905 generally represents any type or form of paired device. Thus, the following discussion of neckband 1905 may also apply to various other paired devices, such as charging cases, smart watches, smart phones, wrist bands, other wearable devices, hand-held controllers, tablet computers, laptop computers, other external compute devices, etc.

As shown, neckband 1905 may be coupled to eyewear device 1902 via one or more connectors. The connectors may be wired or wireless and may include electrical and/or non-electrical (e.g., structural) components. In some cases, eyewear device 1902 and neckband 1905 may operate independently without any wired or wireless connection between them. While FIG. 19 illustrates the components of eyewear device 1902 and neckband 1905 in example locations on eyewear device 1902 and neckband 1905, the components may be located elsewhere and/or distributed differently on eyewear device 1902 and/or neckband 1905. In some embodiments, the components of eyewear device 1902 and neckband 1905 may be located on one or more additional peripheral devices paired with eyewear device 1902, neckband 1905, or some combination thereof.

Pairing external devices, such as neckband 1905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1900 may be provided by a paired device or shared between a paired device and an eyewear device, thus reducing the weight, heat profile, and form factor of the eyewear device overall while still retaining desired functionality. For example, neckband 1905 may allow components that would otherwise be included on an eyewear device to be included in neckband 1905 since users may tolerate a heavier weight load on their shoulders than they would tolerate on their heads. Neckband 1905 may also have a larger surface area over which to diffuse and disperse heat to the ambient environment. Thus, neckband 1905 may allow for greater battery and computation capacity than might otherwise have been possible on a stand-alone eyewear device. Since weight carried in neckband 1905 may be less invasive to a user than weight carried in eyewear device 1902, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1905 may be communicatively coupled with eyewear device 1902 and/or to other devices. These other devices may provide certain functions (e.g., tracking, localizing, depth mapping, processing, storage, etc.) to augmented-reality system 1900. In the embodiment of FIG. 19, neckband 1905 may include two acoustic transducers (e.g., 1920(I) and 1920(J)) that are part of the microphone array (or potentially form their own microphone subarray). Neckband 1905 may also include a controller 1925 and a power source 1935.

Acoustic transducers 1920(I) and 1920(J) of neckband 1905 may be configured to detect sound and convert the detected sound into an electronic format (analog or digital). In the embodiment of FIG. 19, acoustic transducers 1920(I) and 1920(J) may be positioned on neckband 1905, thereby increasing the distance between the neckband acoustic transducers 1920(I) and 1920(J) and other acoustic transducers 1920 positioned on eyewear device 1902. In some cases, increasing the distance between acoustic transducers 1920 of the microphone array may improve the accuracy of beamforming performed via the microphone array. For example, if a sound is detected by acoustic transducers 1920(C) and 1920(D) and the distance between acoustic transducers 1920(C) and 1920(D) is greater than, for example, the distance between acoustic transducers 1920(D) and 1920(E), the determined source location of the detected sound may be more accurate than if the sound had been detected by acoustic transducers 1920(D) and 1920(E).

Controller 1925 of neckband 1905 may process information generated by the sensors on neckband 1905 and/or augmented-reality system 1900. For example, controller 1925 may process information from the microphone array that describes sounds detected by the microphone array. For each detected sound, controller 1925 may perform a direction-of-arrival (DOA) estimation to estimate a direction from which the detected sound arrived at the microphone array. As the microphone array detects sounds, controller 1925 may populate an audio data set with the information. In embodiments in which augmented-reality system 1900 includes an inertial measurement unit, controller 1925 may compute all inertial and spatial calculations from the IMU located on eyewear device 1902. A connector may convey information between augmented-reality system 1900 and neckband 1905 and between augmented-reality system 1900 and controller 1925. The information may be in the form of optical data, electrical data, wireless data, or any other transmittable data form. Moving the processing of information generated by augmented-reality system 1900 to neckband 1905 may reduce weight and heat in eyewear device 1902, making it more comfortable to the user.

Power source 1935 in neckband 1905 may provide power to eyewear device 1902 and/or to neckband 1905. Power source 1935 may include, without limitation, lithium ion batteries, lithium-polymer batteries, primary lithium batteries, alkaline batteries, or any other form of power storage. In some cases, power source 1935 may be a wired power source. Including power source 1935 on neckband 1905 instead of on eyewear device 1902 may help better distribute the weight and heat generated by power source 1935.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 2000 in FIG. 20, that mostly or completely covers a user's field of view. Virtual-reality system 2000 may include a front rigid body 2002 and a band 2004 shaped to fit around a user's head. Virtual-reality system 2000 may also include output audio transducers 2006(A) and 2006(B). Furthermore, while not shown in FIG. 20, front rigid body 2002 may include one or more electronic elements, including one or more electronic displays, one or more inertial measurement units (IMUS), one or more tracking emitters or detectors, and/or any other suitable device or system for creating an artificial-reality experience.

Artificial reality systems may include a variety of types of visual feedback mechanisms. For example, display devices in augmented-reality system 1900 and/or virtual-reality system 2000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial reality systems may include a single display screen for both eyes or may provide a display screen for each eye, which may allow for additional flexibility for varifocal adjustments or for correcting a user's refractive error. Some of these artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial reality systems described herein may include one or more projection systems. For example, display devices in augmented-reality system 1900 and/or virtual-reality system 2000 may include microLED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

The artificial reality systems described herein may also include various types of computer vision components and subsystems. For example, augmented-reality system 1900 and/or virtual-reality system 2000 may include one or more optical sensors, such as two-dimensional (2D) or 3D cameras, structured light transmitters and detectors, time-of-flight depth sensors, single-beam or sweeping laser rangefinders, 3D LiDAR (light detection and ranging) sensors, and/or any other suitable type or form of optical sensor. An artificial reality system may process data from one or more of these sensors to identify a location of a user, to map the real world, to provide a user with context about real-world surroundings, and/or to perform a variety of other functions.

The artificial reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed (e.g., including video signal data), transform the data (e.g., into display drive and/or backlight control signals), output a result of the transformation to perform a function (e.g., to display an image on a display and/or to control the brightness of a backlight or a portion thereof), use the result of the transformation to perform any such function, and store the result of the transformation to perform any such function (e.g., in a memory). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference may be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device, comprising:
a backlight unit comprising an arrangement of light-emissive elements; and
a driver circuit comprising:
a voltage boost circuit configured to receive a device input voltage and generate a backlight drive voltage; and
a pulse modulation circuit configured to provide a pulse modulation signal having a duty ratio to the voltage boost circuit, comprising:
a digital pulse width modulation controller;
a loop gain adjuster; and
an analog-to-digital converter configured to receive a headroom signal from a headroom processor and to provide a control signal to the loop gain adjuster thereby adjusting the digital pulse width modulation controller, wherein:
the device input voltage is between 3 V and 4.5 V;
the backlight drive voltage is between 20 V and 40 V;
the duty ratio is in a range of 5% to 20%;
the pulse modulation controller is configured to adjust the pulse modulation signal based on the headroom signal;
the device has an input power factor of greater than 0.9;
a loop gain of the pulse modulation controller is adjusted based on the headroom signal; and
the device is a head-mounted device.

2. The device of claim 1, wherein:
the voltage boost circuit comprises a transistor; and
the transistor is configured to receive the pulse modulation signal having the duty ratio.

3. The device of claim 2, wherein the voltage boost circuit further comprises at least one capacitor and at least one inductor.

4. The device of claim 2, wherein:
the transistor is a MOSFET; and
the pulse modulation circuit is further configured to:
receive a soft-start signal based on a drain-source resistance of the MOSFET; and
reduce an input current ripple using the soft-start signal.

5. The device of claim 1, wherein the arrangement of light-emissive elements comprises light-emitting diodes (LEDs).

6. The device of claim 5, wherein:
the LEDs are arranged in a plurality of LED strings; and
the plurality of LED strings is arranged in a parallel electrical configuration.

7. The device of claim 6, wherein each of the plurality of LED strings has an associated constant current driver.

8. The device of claim 1, wherein the device further comprises a headroom processor configured to receive a plurality of headroom voltages from the backlight unit and to provide a headroom signal.

9. The device of claim 8, wherein:
the headroom processor is further configured to select a lowest headroom voltage from the plurality of headroom voltages; and
the headroom signal is based on the lowest headroom voltage.

10. The device of claim 8, wherein the pulse modulation circuit is configured to adjust the backlight drive voltage based on the headroom signal.

11. The device of claim 1, wherein:
the device further comprises an electronic display associated with the backlight unit; and
the device is configured so that light from the backlight unit passes through at least a portion of the electronic display.

12. The device of claim 1, wherein the device is a virtual reality device.

13. The device of claim 1, wherein the device is an augmented reality device.

14. A method, comprising:
receiving a device input voltage;
boosting the device input voltage to obtain a backlight drive voltage; and
driving a backlight unit using the backlight drive voltage, wherein:
the backlight unit comprises an arrangement of light-emitting diodes (LEDs); and
boosting the device input voltage comprises:
obtaining a pulse modulation signal from an analog pulse modulation circuit, wherein:
the analog pulse modulation circuit is configured to provide a pulse modulation signal having a duty ratio to a voltage boost circuit and comprises a pulse width modulation controller, a loop gain adjuster, and an analog-to-digital converter configured to receive a headroom signal from a driver circuit and to provide a control signal to the loop gain adjuster, thereby adjusting the analog pulse modulation circuit;
the device input voltage is between 3 V and 4.5 V;
the backlight drive voltage is between 20 V and 40 V;
the duty ratio is in a range of 5% to 20%;
the pulse modulation controller is configured to adjust the pulse modulation signal based on the headroom signal;
the device has an input power factor of greater than 0.9;
a loop gain of the pulse modulation controller is adjusted based on the headroom signal; and
the device is a head-mounted device.

15. The method of claim 14, wherein the arrangement of LEDs comprises a plurality of LED strings, and the method further comprises:
obtaining headroom voltages from the plurality of LED strings;
determining a headroom signal based on a lowest headroom voltage of the headroom voltages; and
adjusting the pulse modulation signal based on the headroom signal.

16. The method of claim 14, wherein receiving the device input voltage comprises receiving the device input voltage from a battery.

* * * * *